United States Patent
Dharia et al.

(10) Patent No.: US 7,613,463 B2
(45) Date of Patent: Nov. 3, 2009

(54) SYSTEM FOR FAST MACRODIVERSITY SWITCHING IN MOBILE WIRELESS NETWORKS

(76) Inventors: Bhupal Kanaiyalal Dharia, 10768 Maxine Ave., Mountain View, CA (US) 95014; Gopal Chillariga, 125 Connemara Way, #160, Sunnyvale, CA (US) 94087; Ujjal Kumar Ghoshtagore, 4333 E. 2nd St., Long Beach, CA (US) 50803; Rohit Kaushal, 20197 Northbrook Sq., Cupertino, CA (US) 95014; Gerhard Albert Koepf, 700 Kalmia Ave., Boulder, CO (US) 80304-1738; Lance Kazumi Uyehara, 1026 Del Cambre Dr., San Jose, CA (US) 95129

( * ) Notice: Subject to any disclaimer, the term of this patent is extended or adjusted under 35 U.S.C. 154(b) by 0 days.

(21) Appl. No.: 12/245,515

(22) Filed: Oct. 3, 2008

(65) Prior Publication Data

US 2009/0029713 A1 Jan. 29, 2009

Related U.S. Application Data

(63) Continuation of application No. 09/750,592, filed on Dec. 28, 2000, now Pat. No. 7,433,683.

(51) Int. Cl.
 *H04W 72/00* (2006.01)
(52) U.S. Cl. ............ 455/450; 455/447; 455/452.2; 455/560; 370/310.1; 370/351; 375/132
(58) Field of Classification Search ............. 455/422.1, 455/446–448, 450–452.2; 370/337, 347; 375/132

See application file for complete search history.

(56) References Cited

U.S. PATENT DOCUMENTS

| | | | |
|---|---|---|---|
| 4,797,947 A | 1/1989 | Labedz | |
| 5,425,049 A | 6/1995 | Dent | |
| 5,442,681 A * | 8/1995 | Kotzin et al. | 455/450 |
| 5,459,759 A | 10/1995 | Schilling | |
| 5,594,943 A | 1/1997 | Balachandran | |
| 5,661,723 A * | 8/1997 | Ueno et al. | 370/315 |
| 5,663,957 A | 9/1997 | Dent | |

(Continued)

FOREIGN PATENT DOCUMENTS

WO 9608119 3/1996

(Continued)

*Primary Examiner*—Sharad Rampuria

(57) ABSTRACT

Fast macrodiversity switching (FMS) dynamically switches radio links used for traffic and control channels for a mobile station among a number of base transceiver stations (BTS) without changing the radio resource, that is, using the same frequency and time slot combination (TDMA) or frequency and spreading code combination (CDMA). The traffic channel switching is under control of zone managers. Each BTS includes a zone manager where a host BTS has its zone manager designated as a host zone manager and other BTSs (assistant BTSs) have their zone managers designated as assistant zone managers. The control by the host and assistant zone managers includes switching down-link signals to and up-link signals from mobile stations among base transceiver stations which include broadcast channels (non-switched) and dedicated (switched) channels. Measurements of the wireless signals are made at macrodiverse locations. Zone managers process the measurements to determine preferred ones of the transceiver stations for particular dedicated channels for a particular mobile station.

73 Claims, 6 Drawing Sheets

U.S. PATENT DOCUMENTS

| | | | |
|---|---|---|---|
| 5,663,958 A | 9/1997 | Ward | |
| 5,715,516 A * | 2/1998 | Howard et al. | 455/422.1 |
| 5,729,538 A | 3/1998 | Dent | |
| 5,757,787 A | 5/1998 | Dent | |
| 5,757,789 A | 5/1998 | Dent | |
| 5,805,576 A | 9/1998 | Worley et al. | |
| 5,812,539 A | 9/1998 | Dent | |
| 5,828,948 A * | 10/1998 | Almgren et al. | 455/450 |
| 5,862,142 A | 1/1999 | Takiyasu et al. | |
| 5,905,960 A | 5/1999 | Nicholl et al. | |
| 5,909,651 A | 6/1999 | Chander et al. | |
| 5,913,167 A | 6/1999 | Bonta et al. | |
| 5,959,984 A | 9/1999 | Dent | |
| 5,974,032 A | 10/1999 | Snowden et al. | |
| 6,005,884 A | 12/1999 | Cook et al. | |
| 6,031,863 A | 2/2000 | Jusa et al. | |
| 6,034,988 A | 3/2000 | VanderMey et al. | |
| 6,049,561 A | 4/2000 | Pezzlo et al. | |
| 6,070,071 A * | 5/2000 | Chavez et al. | 455/422.1 |
| 6,084,865 A | 7/2000 | Dent | |
| 6,094,575 A | 7/2000 | Anderson et al. | |
| 6,112,058 A | 8/2000 | Walters et al. | |
| 6,112,094 A | 8/2000 | Dent | |
| 6,125,125 A | 9/2000 | Narasimha et al. | |
| 6,128,512 A | 10/2000 | Trompower et al. | |
| 6,131,034 A | 10/2000 | McLaughlin et al. | |
| 6,137,784 A | 10/2000 | Wallerius et al. | |
| 6,138,037 A * | 10/2000 | Jaamies | 455/560 |
| 6,157,669 A | 12/2000 | Kotzin | |
| 6,175,737 B1 * | 1/2001 | Kao | 455/447 |
| 6,175,743 B1 | 1/2001 | Alperovich et al. | |
| 6,192,038 B1 | 2/2001 | Wallerius et al. | |
| 6,212,387 B1 * | 4/2001 | McLaughlin et al. | 455/450 |
| 6,240,073 B1 | 5/2001 | Reichman et al. | |
| 6,240,125 B1 | 5/2001 | Andersson et al. | |
| 6,246,713 B1 | 6/2001 | Mattisson | |
| 6,249,540 B1 | 6/2001 | Dicker et al. | |
| 6,275,518 B1 | 8/2001 | Takahashi et al. | |
| 6,304,837 B1 | 10/2001 | Geiger et al. | |
| 6,341,124 B1 | 1/2002 | Johansson et al. | |
| 6,349,094 B1 | 2/2002 | Vastano et al. | |
| 6,381,234 B2 | 4/2002 | Sakoda et al. | |
| 6,434,184 B2 | 8/2002 | Lindsey | |
| 6,466,138 B1 | 10/2002 | Partyka | |
| 6,473,442 B1 * | 10/2002 | Lundsjo et al. | 370/537 |
| 6,484,287 B1 | 11/2002 | Hagele et al. | |
| 6,490,262 B1 | 12/2002 | Hogger | |
| 6,504,837 B1 * | 1/2003 | Menzel | 370/351 |
| 6,522,643 B1 | 2/2003 | Jacomb-Hood et al. | |
| 6,526,027 B1 | 2/2003 | Yeom | |
| 6,597,671 B1 | 7/2003 | Ahmadi et al. | |
| 6,628,946 B1 | 9/2003 | Wiberg et al. | |
| 6,636,550 B1 | 10/2003 | Horikoshi et al. | |
| 6,700,920 B1 | 3/2004 | Partyka | |
| 6,724,739 B1 | 4/2004 | Tiedemann, Jr. et al. | |
| 6,791,997 B2 | 9/2004 | Beyer et al. | |
| 6,799,044 B1 | 9/2004 | Wesby et al. | |
| 6,826,406 B1 | 11/2004 | Vialen et al. | |
| 6,831,913 B1 | 12/2004 | Vialen | |
| 6,850,501 B1 | 2/2005 | Sebire | |
| 6,882,847 B2 | 4/2005 | Craig et al. | |
| 6,920,171 B2 | 7/2005 | Souissi et al. | |
| 6,934,275 B1 | 8/2005 | Love et al. | |
| 6,987,793 B2 | 1/2006 | Dhar et al. | |
| 6,993,342 B2 * | 1/2006 | Kuchibhotla et al. | 455/450 |
| 7,002,910 B2 | 2/2006 | Garcia-Luna-Aceves et al. | |
| 7,010,015 B2 | 3/2006 | Hervey et al. | |
| 7,010,050 B2 | 3/2006 | Maryanka | |
| 7,012,971 B2 | 3/2006 | Chen et al. | |
| 7,013,143 B2 * | 3/2006 | Love et al. | 455/450 |
| 7,020,115 B2 | 3/2006 | Chillariga et al. | |
| 7,068,631 B2 | 6/2006 | Eriksson et al. | |
| 7,068,702 B2 | 6/2006 | Chen et al. | |
| 7,194,017 B2 * | 3/2007 | Hervey et al. | 375/132 |
| 7,212,515 B2 | 5/2007 | Dharia et al. | |
| 7,289,469 B2 | 10/2007 | Alapuranen, et al. | |
| 7,292,617 B2 | 11/2007 | Beasley et al. | |
| 7,301,986 B2 | 11/2007 | Partyka | |
| 7,433,683 B2 | 10/2008 | Dharia, et al. | |
| 2003/0086515 A1 | 5/2003 | Trans et al. | |
| 2006/0078039 A1 | 4/2006 | Dhar et al. | |
| 2006/0153147 A1 | 7/2006 | Chillariga et al. | |
| 2007/0066330 A1 | 3/2007 | Dharia et al. | |

FOREIGN PATENT DOCUMENTS

| | | |
|---|---|---|
| WO | 9836509 | 8/1998 |
| WO | 9848529 | 10/1998 |
| WO | 9854850 | 12/1998 |
| WO | 9913652 | 3/1999 |
| WO | 0060892 | 10/2000 |
| WO | 0076251 | 12/2000 |

* cited by examiner

SYSTEM FOR FAST MACRODIVERSITY SWITCHING IN MOBILE WIRELESS NETWORKS

This application is a continuation of Ser. No. 09/750,592 titled "SYSTEM FOR FAST MACRODIVERSITY SWITCHING IN MOBILE WIRELESS NETWORKS" and filed Dec. 28, 2000 now U.S. Pat. No. 7,433,683, whose inventors are Bhupal Kanaiyalal Dharia, Gopal Chillariga, Ujjal Kumar Ghoshtagore, Rohit Kaushal, Albert Gerhard Koepf and Lance Kazumi Uyehara and which is hereby incorporated by reference in its entirety as though fully and completely set forth herein.

BACKGROUND OF THE INVENTION

The present invention relates to the field of mobile wireless communication systems and more specifically to methods and apparatus for communication with mobile telephone users (cellular and personal communication systems), mobile wireless data communications, two-way paging and other mobile wireless systems.

In a mobile wireless network, mobile stations (MS) are typically in communications with one base transceiver station (BTS) through up and down radio links. Such ground-based radio links suffer from strong local variations in path loss mainly due to obstructions and line-of-sight attenuation. As MS move from one point to another, their signal path losses go through shadow fading fluctuations that are determined, among other things, by the physical dimension of the obstructions, antenna heights and MS velocity. These variations in path loss, must be taken into account in the design of the up-link and down-link radio link resource allocation.

While communicating with a specific host BTS, MS are frequently within the communications range of other BTS. Statistically, due to the distribution of physical obstructions, the shadow fading path loss fluctuations to such other BTS tend to be only weakly correlated with the path loss fluctuations on the link between the MS to host BTS link. It is therefore possible that a MS, at anyone time and location, has a lower path loss to a different BTS than the one it is communicating with.

In a conventional wireless network using the GSM standard, the base station controller (BSC) manages the radio link resources of the BTS. These resources are determined by the number of transceivers installed at the BTS and the number of radio channels anyone transceiver can handle. For example, in TDMA standards, a radio channel consists of a frequency and a time slot. In CDMA standards, a radio channel is represented by a frequency and one of a number of orthogonal spreading codes.

A BTS has two principal functions, that of controlling the radio links with all MSs within its cell, and relaying traffic between the BSC and the MSs. Relaying traffic includes receiving down-link traffic from the BSC and broadcasting it to MSs using broadcasters and that of receiving up-link traffic from the MSs using radio receivers called collectors and relaying it to the BSC.

In a mobile wireless network with a BSC, the BSC controls the assignment of the radio link resources (including Broadcasters and Collectors) in the BTSs as well as the operation of the network, and, through the MSC, provides an interface with the Public Switched Telephone Network (PSTN). For generality, the BTS broadcasting and collecting functions can be considered as separate entities. In most existing networks, however, broadcasters (B) and collectors (C) are co-located.

In one example, three base transceiver stations (BTS) include three broadcasters and three collectors where broadcasters and collectors are typically but not necessarily co-located. The broadcasters and collectors have down-links and up-links to the BSC. These links are typically cabled links such as T1/E1 lines. The connection of these links between the broadcasters or collectors with the BSC may be arranged in various configurations such as a star-like pattern, a daisy-chain pattern or in any combination of these or other patterns.

When a connection is setup between a MS and the mobile network, a BSC selects the BTS that has the best radio access to the MS. This setup process includes a series of signal transmissions back and forth between the BSC, the BTSs, and the MSs using up-link and down-link radio control channels. The setup process results in the assignment of dedicated radio traffic and control channels for the up-links and down-links for communications between the MSs and the BTSs. Once these connections are set-up, user traffic, also called payload, can be transmitted between the MSs and the BSC. While the connection lasts, the BTS/BSC controls the operation of the radio traffic channels, including power control, frequency hopping, and timing advance. Also, the BTS/BSC continues to use the radio broadcast channels for operation, maintenance and signaling with all other MSs in its cell.

Users (MSs) communicate with collectors via control up-links and traffic up-links and with broadcasters via control down-links and traffic down-links. A particular broadcaster and collector is called the host broadcaster and the host collector for a particular MS. Together, they perform the function of the host BTS for the particular MS.

As MSs move within a cell and as the average path loss between an MS and its serving broadcaster and collector degrades, existing networks reassign the MS to another BTS (with a broadcaster and collector) that has a lower path loss. This process is called handover or handoff. Prior systems distinguish between hard and soft handover. During hard handover, both the control and traffic radio links between the MS and BTS are terminated and new radio links are set-up between the MS and the new BTS using the radio resources assigned to the new BTS. In case of a handoff failure, the MS and BTS reestablish the control and traffic radio link as it existed before the handoff was attempted. This hard handover is used in GSM networks. In CDMA networks, hard and soft handoff is practiced. In soft handoff, the new radio links are setup before the old links are terminated (make before break operation). CDMA allows simultaneous communications of a MS with a number of BTS during soft handoff.

One technique for maintaining low transmit power during the operation of a mobile radio link is dynamic power control. It may be applied on both the up-link and down-link directions or only in one direction, and it may be performed in an open-loop or closed-loop mode. In open-loop power control mode, the transmit power is determined by system level parameters. In closed-loop power control mode, the power is dynamically set in response to radio link measurements such as distance measurements between the MS and the BTS (as determined by time of arrival measurements), receive signal strength measurements, or error rate measurements.

Another known method to improve network performance is the use of macrodiversity signal combining (also called aggregation). This method uses multiple spaced-apart transmitter/broadcasters and collector/receivers in the BTSs to simultaneously communicate with a MS. The soft handoff practiced in CDMA is such an example. On the down-link, the signal is transmitted from multiple spaced-apart broadcasters using down-link traffic channels. These multiple signals are received by the MS (for example using a rake receiver in CDMA), and combined, to provide a processed signal with a higher level of confidence. On the up-link, multiple spaced-apart receivers/collectors receive the signal transmitted by the MS on up-link traffic channels. These multiple receive signals are then transported to a central location and processed to provide a processed signal with a higher confidence level then any of the individual signals would provide. One disadvantage of macrodiversity combining, when used on the up-link, is the added backhaul associated with transporting the receive signals from multiple collectors to one central location.

While many different wireless networks have been proposed, there is a need for improved wireless networks that achieve the objectives of improved performance and higher density of MSs.

SUMMARY

The present invention is a method and apparatus for fast macrodiversity switching (FMS). The fast macrodiversity switching dynamically switches radio links used for traffic and control channels for a mobile station among a number of base transceiver stations (BTS) without changing the radio resource, that is, using the same frequency and time slot combination (TDMA) or frequency and spreading code combination (CDMA).

The channel switching is under control of zone managers. Each BTS includes or is otherwise associated with a zone manager where a host BTS has its zone manager designated as a host zone manager and other BTSs (assistant BTSs) have their zone managers designated as assistant zone managers.

The control by the host and assistant zone managers includes switching down-link signals to and up-link signals from mobile stations among base transceiver stations which include broadcast channels (non-switched) and dedicated (switched) channels. Measurements of the wireless signals are made at macrodiverse locations. Zone managers process the measurements to determine preferred ones of the transceiver stations for particular dedicated channels for a particular mobile station. Preferred ones of the transceiver stations are dynamically selected to provide the dedicated channels for the mobile stations separately from the transceiver stations providing broadcast channels for the mobile stations. The measurements are made on the up-link signals from the mobile stations. The dedicated channels are switched as frequently as a signal change time which can be as frequent as the frequency of the measured signals, for example, the frame rate of the up-link signals. The change time is typically less than 1 second for mobile stations.

The foregoing and other objects, features and advantages of the invention will be apparent from the following detailed description in conjunction with the drawings.

DETAILED DESCRIPTION

Figure 1:
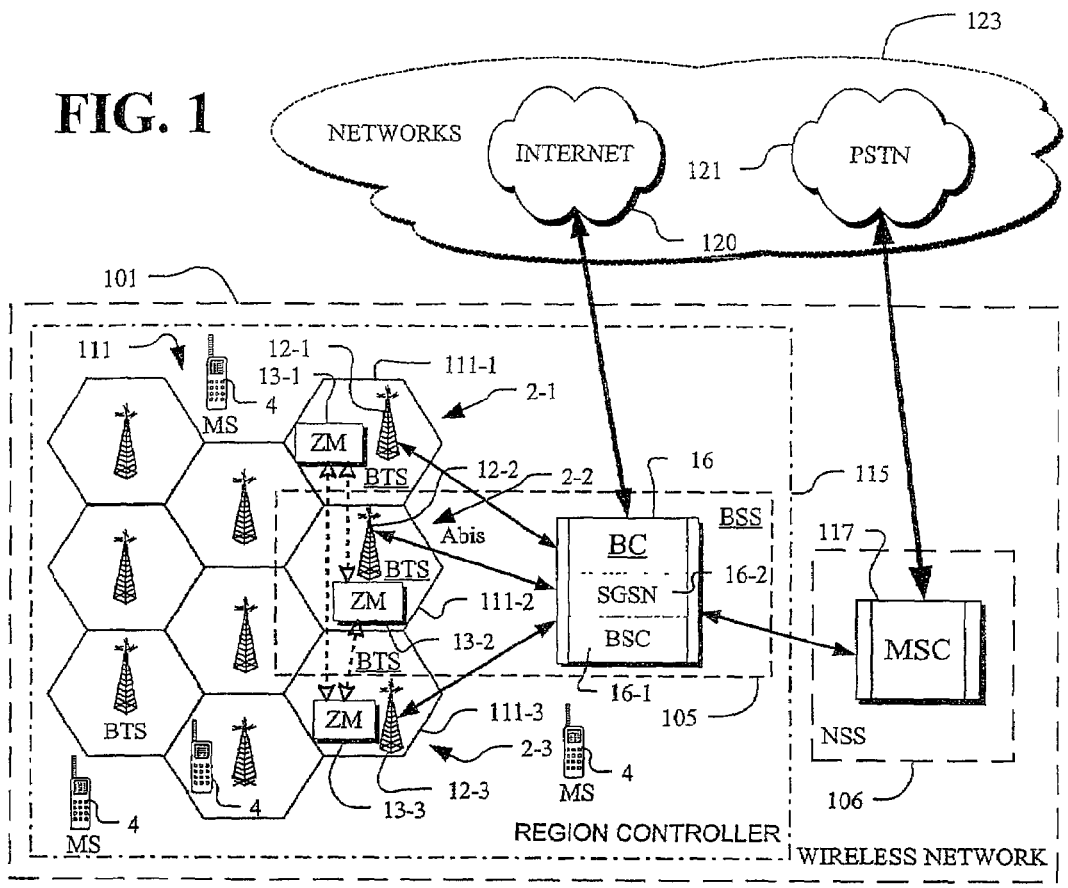
FIG. 1 depicts a wireless network formed of multiple base transceiver stations (BTSS) and multiple associated zone managers (ZMs).

FIG. 1 depicts a mobile wireless network 101 including base transceiver stations 12 that have radio down-links and radio up-links to a base controller 16. These links are typically cabled links such as T1/E1 lines. The base controller 16 is formed of a base station controller (BSC) 16-1 and a Serving GPRS Support Node (SGSN) 16-2. The BSC 16-1 controls the assignment of the radio link resources and the operation of the network and has an interface through the mobile switching center (MSC) 117, with the Public Switched Telephone Network (PSTN) 121 of networks 123. The SGSN 16-2 is primarily responsible for mobility management, detects mobile stations in the local area for the transmission and receipt of packets. Additionally, it locates and identifies the status of mobile stations and gathers crucial call information. The SGSN operates with standard network interfaces and capabilities for the transport of IP using Frame Relay and ATM over physical interfaces.

In FIG. 1, the base controller (BC) 16, including the base station controller (BSC) 16-1 and the SGSN 16-2, are part of the base station system (BSS) 115. The BSC 16-1 communicates with the base transceiver stations (BTS) 12 within the cells 111 of the wireless network 101. The cells 111-1, 111-2 and 111-3 are shown in expanded detail to include the BTS 12-1, 12-2 and 12-3, respectively, and the associated zone managers (ZM) 13 including ZMs 13-1, 13-2 and 13-3, respectively. The ZMs 13-1, 13-2 and 13-3 are interconnected to form a zone network that controls the macrodiversity switching of the channels among the BTSs 12. The zone network interconnecting the zone managers 13 can be in any form including mesh, daisy-chain, star or otherwise.

In FIG. 1, the MSs 4 are mobile within the cell region 111 and can move, for example, between the cells 111-1, 111-2 and 111-3. As MSs 4 move in the region 111, the ZMs 13 operate to implement the fast macrodiversity switching of the channels.

In FIG. 1, the control functions of the BC 16, the BTS 12 and the ZM 13 collectively are part of a region controller 115 which controls the operation of the wireless network 101.

In FIG. 1, the MSC 117, part of a network and switching subsystem (NSS) 106, connects to the PSTN 121 within the networks 123. Similarly, the SGSN 16-2 of the BC 16 connects directly to the internet 120 of the networks 123.

In the wireless mobile network 111 of FIG. 1, when a connection to a BTS is setup for MS, the BSC selects the BTS that has the best radio access to the MS as host BTS. This setup process includes a series of signal transmissions back and forth between the BSC, the BTSs, and the MS using up-link and down-link radio control channels, and results in the assignment of dedicated radio traffic and control channels for the up-link and down-link between the MS and the BTS. Once this connection is set-up, user traffic is transmitted between the MS and the BSC. While the connection lasts, the BTS/BSC controls the operation of the radio traffic channels, including power control, frequency hopping, and timing advance on dedicated control channels, while it continues to use the radio broadcast channel for operation, maintenance and signaling with all the other MSs in the cell.

In the wireless mobile network 111 of FIG. 1, broadcast channels and dedicated channels are separate. Dedicated channels include control and traffic channels specific to an MS. Broadcast channels are used for signaling and control messages shared by all MSs within the cell, including MSs that are not in use. Broadcast and dedicated channels are carried over radio links. Traffic channels are used to transport user signals also called payload which can be voice or data. To ensure that all MSs within the cell have access to the control signals, the radio link for the broadcast channel is designed to be very reliable by using robust coding and modulation techniques and a high transmit power level.

In the wireless network 111 of FIG. 1, dedicated radio links serve individual MSs and are at times operated at lower power levels. For instance, MSs close to a BTS do not require large transmit power levels and are operated at the minimum level meeting the link quality requirements. The reason for reducing power is to conserve radio band resources to enable reuse of radio resources in as many cells in the network as possible. MSs sharing up-link radio resources generate co-channel interference at their respective BTSs and BTSs sharing down-link radio resources generate co-channel interference at their respective MSs.

Shadow fading imposes large fluctuations on the path loss between a particular MS moving in a cell and its serving BTS. At times when the path loss to the BTS is high, a high transmit power is used to maintain the quality of service. At such times, it is likely that the path loss between the particular MS and another BTS is lower because shadow fading effects between a MS and different BTSs are not highly correlated. Therefore, such other BTS can communicate traffic and/or control signals with the particular MS using lower up-link and down-link power levels. By switching the traffic and/or control channel over to such other BTS, the contribution of the particular radio link to the interference level in the network for other MS-BTS links that use the same radio resources is reduced. When such switching is implemented for many radio links in a network, a larger number of links can be operated in the network increasing network capacity without adding radio bandwidth.

To take advantage of the de-correlation of shadow fading effects, a BTS with the lowest instantaneous path loss for communicating up-link and down-link channels to a particular MS is selected using fast macrodiversity switching. In order to implement the operation, host and assistant BTSs are employed in some embodiments. The host BTS is the BTS that is selected by the BSC 16-1 during connection set-up for communications with a particular MS 4. The host BTS remains in control of the particular MS 4 via its broadcast channel until a handover is carried out. The dedicated channels with the particular MS are routed originally through the host BTS. When another BTS with a lower path loss becomes available, traffic and control channels are routed through such other BTS, which is designated as the assistant BTS for particular channels. As an MS moves through the cell, and as its path and shadow-fading losses change, the dedicated channels are switched among a number of BTSs in the network, including the host BTS. This channel switching continues until the path loss between the particular MS and the host BTS becomes too high and a handover of the broadcast and dedicated channels is executed.

In the fast macrodiversity selection (FMS) process described, the radio resource used for the a dedicated channel (frequency, time slot, code) for the host BTS is not changed. FMS is therefore different from the handover process where both, the broadcast and dedicated channels are switched from radio resources assigned to the old BTS to radio resources assigned to the new BTS in accordance with a frequency reuse plan.

The time scale of the fast macrodiversity switching process is fast relative to handover timing. Fast macrodiversity switching operates in one embodiment, for example, at switching speeds less than one second and in the range of 0.02 seconds to 0.25 seconds. In one implementation, the switching speed is determined by the rate at which the network provides radio link measurements, the time behavior of shadow fading and the MS velocity. In practical implementations, the switching speed may be constant or may be variable.

In fast macrodiversity switching operation of FIG. 1, it is assumed for purposes of explanation that BTS 12-1 and ZM 13-1 form the host base station (BS) 2-1 for some particular MS. It is also assumed that BS 2-2 and BS 2-3 are assistant BSs available to transmit and receive channels on a radio resource assigned to the host BS 2-1. Since every BS (including a BTS and a ZM) in the network can be both a host BS for some MSs and an assistant BS for other MSs, each such BS has collector and broadcaster resources that can be tuned to any frequency and time slot available in the network.

In one embodiment, additional broadcaster and collector resources are installed in BTSs over what normally are used in the BTSs. These additional resources can be solely dedicated to perform the assistant BS fast macrodiversity switching functions under the control of a zone manager (ZM) 13. In one embodiment, the use of the original radio resources in the BTS are controlled by the BSC. In another embodiment, the original broadcasters and collectors of a BTS and any additionally installed broadcasters and collectors form a common radio resource pool. In this common pool implementation, all resources in the pool may be used to perform the host and the assistant BTS functions. This common pooling implementation makes better use of the available transceiver (broadcaster and collector) resources. Control of this resource pool may be with the BSC 16-1 for the host BTS function and with the ZMs for the assistant BTS functions, or control of all resources may be with either the BSC 16-1 or the ZMs 13.

Figure 2:
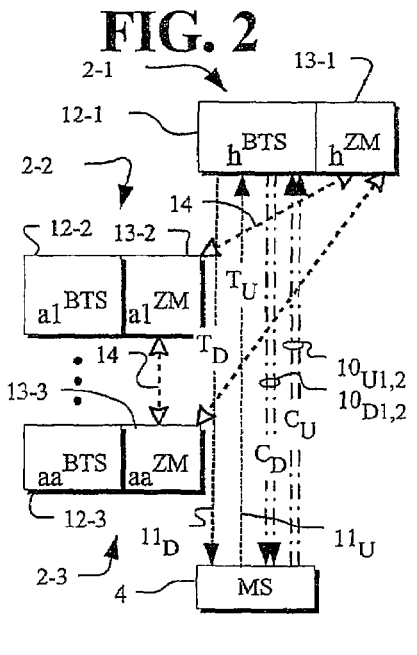
FIG. 2 depicts a wireless network formed of multiple base transceiver stations (BTSs) and multiple zone managers (ZMs) where traffic and control communications are between a host BTS and an MS under control of a host zone manager and assistant zone managers for other BTS.

In FIG. 2, the host BTS ($_hBTS$) 12-1 and the corresponding host ZM ($_hZM$) 13-1 form the host base station ($_hBS$) 2-1 for the particular one MS 4 shown in FIG. 2. The host BTS 12-1 and the MS 4 in the instance of FIG. 2 operate essentially as a standard GSM system. Communications between the $_hBTS$ 12-1 and the MS 4 include the up-link traffic, $T_U$, on link $11_U$ and down-link traffic, $T_D$, on link $11_D$. The control channels include the down-link control, $C_D$, on link $10_{D1,2}$, and the up-link control, $C_U$, on link $10_{U1,2}$. The down-link control channel, $C_D$, has two components, a down-link broadcast control channel on link $10_{D1}$ and a dedicated down-link control channel on link $10_{D2}$. The up-link control channel, $C_U$, has two components, an up-link control channel on link $10_{U1}$ and a dedicated up-link control channel on link $10_{U2}$. Although MS 4 is under control of the host $_h$BTS 12-1, assistant BTSs, including a first assistant $_{a1}$BTS 12-2 and a second assistant $_{aa}$BTS 12-3, associated with the assistant zone managers $_{a1}$ZM 13-2 and $_{aa}$ZM 13-3, respectively, also are available for communications with MS 4. The $_h$ZM zone manager 13-1, $_{a1}$ZM zone manager 13-2 and $_{aa}$ZM zone manager 13-3 are interconnected via link 14 to form the microdiversity switching network for controlling the fast switching of the dedicated channels among the $_h$BTS 12-1, $_{a1}$BTS 12-2 and $_{aa}$BTS 12-3. Any number of BTSs 12 and ZMs 13 can be included in the channel switching network of FIG. 2.

Figure 3:
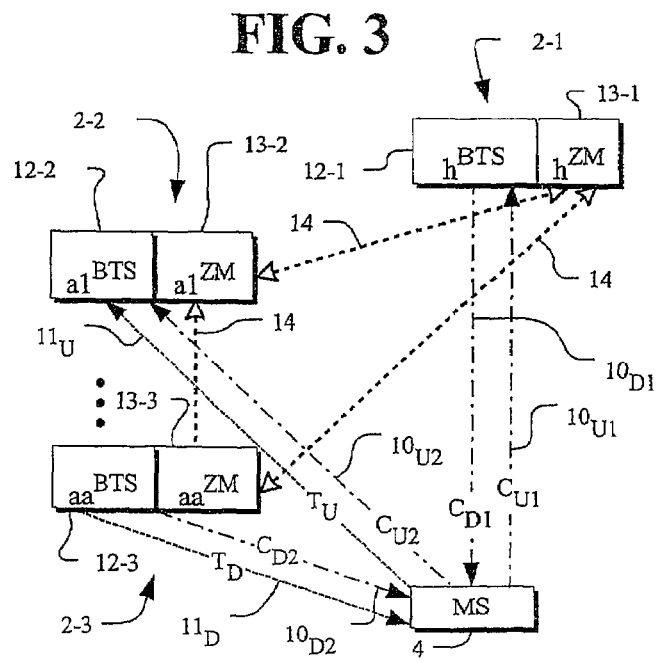
FIG. 3 depicts a wireless network formed of multiple base transceiver stations (BTSs) and multiple zone managers (ZMs) where control and traffic communications have been switched among host and assistant BTS under control of a host zone manager and assistant zone managers.

In FIG. 3, the $_h$BTS 12-1 and the corresponding $_h$ZM 13-1 are the host BTS and the host ZM forming the host BS 2-1 for the MS 4. The relationship between the BTS 12-1 and the MS 4 of FIG. 3 is not like that for a standard GSM system. In FIG. 3, the traffic communication is on dedicated channels that have been switched to be between the assistant $_{a1}$BTS 12-2 in the assistant BS 2-2 and the MS 4 for the up-link traffic, $T_U$, on link $11_U$ and has been switched to assistant $_{aa}$BTS 12-3 in the assistant BS 2-2 for the down-link traffic, $T_D$, on link $11_D$. One part of the control channels, the down-link control, $C_{D1}$ on link $10_{D1}$, is a broadcast channel and that broadcast channel remains between host $_h$BTS 12-1 and MS 4. The other part of the control channels, dedicated down-link control, $C_{D2}$, on link $10_{D2}$ and the up-link control, $C_{U2}$, on link $10_{U2}$, are switched to the assistant $_{aa}$BTS 12-3 and $_{a1}$BTS 12-2, respectively. Although MS 4 is under control of the host $_h$BTS 12-1 via the down-link broadcast channel, the assistant BTSs including $_{a1}$BTS 12-2 and $_{aa}$BTS 12-3, associated with the assistant zone managers $_{a1}$ZM 13-2 and $_{aa}$ZM 13-3, directly carry the payload and the dedicated control channels with MS 4. The FIG. 3 embodiment demonstrates the switching of both traffic and control channels in the fast macrodiversity switching process.

Figure 4:
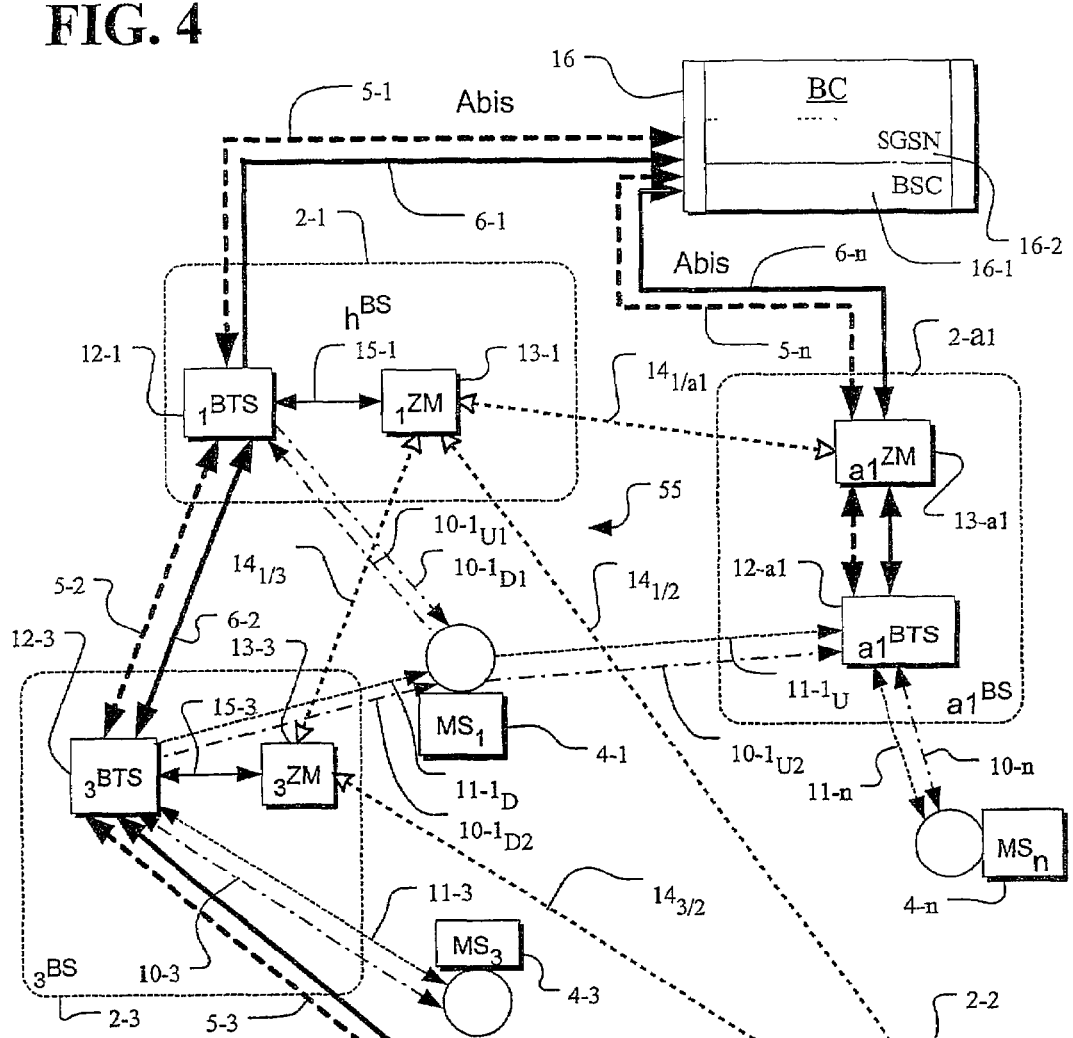
FIG. 4 depicts further details of the host/assistant wireless networks of FIG. 1 through FIG. 3 with host and assistant zone managers.

In FIG. 4, there are n users, MS 4, namely $MS_1$ 4-1, $MS_2$ 4-2, $MS_3$ 4-3, ..., $MS_n$ 4-n. User $MS_1$ is shown communicating with $_h$BTS 12-1 in the host $_h$BS 2-1 via control link 10-1 including down-link control $10\text{-}1_{D1}$ and a control up-link $10\text{-}1_{U1}$. The user $MS_1$, is communicating with a traffic up-link $11\text{-}1_U$ and a control up-link $10\text{-}1_{U2}$ to assistant $_{a1}$BTS 12-a1 in base station 2-a1 and with a traffic down-link $11\text{-}1_D$ and control down-link $10\text{-}1_{D2}$ to assistant $_3$BTS 12-3 in base station 2-3. The $_1$BTS 12-1 is the host BTS for $MS_1$. Similarly, user $MS_2$ communicates with $_2$BTS in BS 2-2 via control and traffic links 10-2 and 11-2, respectively. The $_2$BTS 12-2 is the host BTS for $MS_2$. User $MS_3$ 4-3 communicates with $_3$BTS 12-3 in BS 2-3 via control and traffic links 10-3 and 11-3, respectively. The $_3$BTS 12-3 is the host BTS for $MS_3$ and the $_{a1}$BTS and $_3$BTS are assistant BTS for user $MS_1$.

In FIG. 4, the BSC 16-1 in the base controller (BC) 16 communicates over an Abis interface, including the up-link and down-link control signals 5-1 and the up-link and down-link traffic signals 6-1, with the $_1$BTS 12-1 in base station 2-1. Similarly, the BSC 16-1 communicates over an Abis interface, including the up-link and down-link control signals 5-n and the up-link and down-link traffic signals 6-n connected to the $_{a1}$ZM zone manager 13-a1 in the $_{a1}$BS base station 2-a1.

In FIG. 4, the user $MS_1$ 4-1 communicates with its host $_1$BTS 12-1 which is part of the host base station ($_h$BS) 2-1. Also included in the host base station 2-1 is the zone manager $_1$ZM 13-1 which serves as the host zone manager for the user $MS_1$.

In FIG. 4, the base station $_{a1}$BS base station 2-a1 is an assistant for user $MS_1$ and includes the $_{a1}$ZM zone manager 13-a1 and the assistant $_{a1}$BTS 12-a1. The base station 2-a1 is the host base station for the user $MS_n$ and is an assistant base station for the base station 2-1 that is the host base station for the user $MS_1$ 4-1. In the $_{a1}$BS base station 2-a1, the zone manager 13-a1 is positioned in the Abis interface connection between the BSC 16-1 and the $_{a1}$BTS.

The entities that control the fast macrodiversity switching process are zone managers (ZMs) 13. In the FIG. 4 implementation, one ZM 13 is installed in each cell and is associated with a corresponding BTS 12 for that cell.

In FIG. 4 the zone managers $_1$ZM $_2$ZM, $_3$ZM, ..., $_{a1}$ZM form the zone manager network 55 for controlling the fast macrodiversity switching of the dedicated channels. In the embodiment of FIG. 4, zone manager $_1$ZM connects to zone manager $_3$ZM via the link $14_{1/3}$, the zone manager $_1$ZM connects to the zone manager $_2$ZM via the link $14_{1/2}$ the zone manager $_3$ZM connects to the zone manager $_2$ZM via the link $14_{3/2}$ and the zone manager $_1$ZM connects to the zone manager $_{a1}$ZM via the link $14_{1/a1}$. In some embodiments, the zone manager is separate from the BTS as shown in the base station 2-1 of FIG. 4 with an interface at 15-1 between the $_1$BTS and the $_1$ZM. In other embodiments, the ZM is in the Abis interface connection as shown in the $_{a1}$BS base station 2-a1. In still other embodiments, the ZM is fully integrated with the BTS. The particular implementation selected for the ZM is a matter of design choice.

In FIG. 4, broadcasters and collectors are included as a common entity in each BTS 12. In some wireless networks broadcasters and collectors for the same BTS are separated by macro-diverse distances and are therefore considered separately. The usual configuration where the up-link and down-link path losses typically are highly correlated has broadcasters and collectors co-located at the BTS.

FIG. 4 represents a snap shot of an fast macrodiversity switching implementation for one particular period of time analogous to the configuration of FIG. 3. Any of the MS, for example $MS_2$ or $MS_3$ can also communicate with different BTS on their dedicated channels at any time in the manner suggested in FIG. 2 through FIG. 12. The FIG. 4 embodiment has distributed zone managers. In another embodiment, the zone manager function can be centralized and located, for example, in the BSC 16-1. As shown in FIG. 4, the zone manager may be integrated or connected with the BTS, or located on the Abis link.

Figure 5:
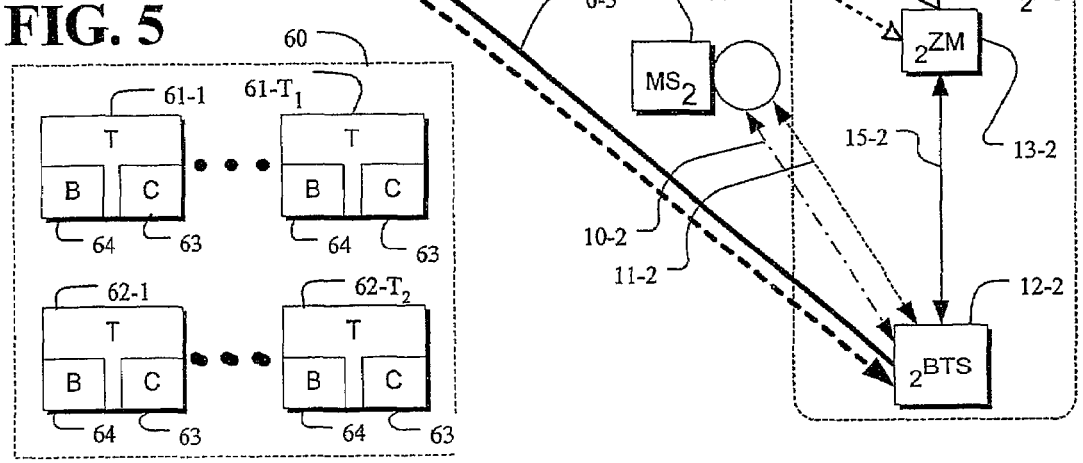
FIG. 5 depicts a representation of the transceivers which form a part of each of the base transceiver stations of FIG. 4.

FIG. 5 depicts a representation of the transceivers 60 which form a part of each of the base stations 2 of FIG. 4. In FIG. 5, the transceivers 61 and 62 each include a co-located broadcaster (B) and collector (C). When employing SDMA protocols, the transceivers 61 and 62 in some embodiments use smart antennas. The transceivers 61-1, ..., 61-T.sub.1 are the transceivers that are present in an ordinary GSM installation. The transceivers 62-1, ..., 62-T.sub.2 are the transceivers that are added in connection with fast macrodiversity switching. The transceivers 61 and 62 of FIG. 5 can be considered as a single pool allocated for any function in a base station 2 or can remain segregated so that the transceivers 61-1, ..., 61-T.sub.1 are allocated for ordinary base station operation and the transceiver 62-1, ..., 62-T.sub.2 are allocated by zone managers only for macrodiversity switching functions.

Figure 6:
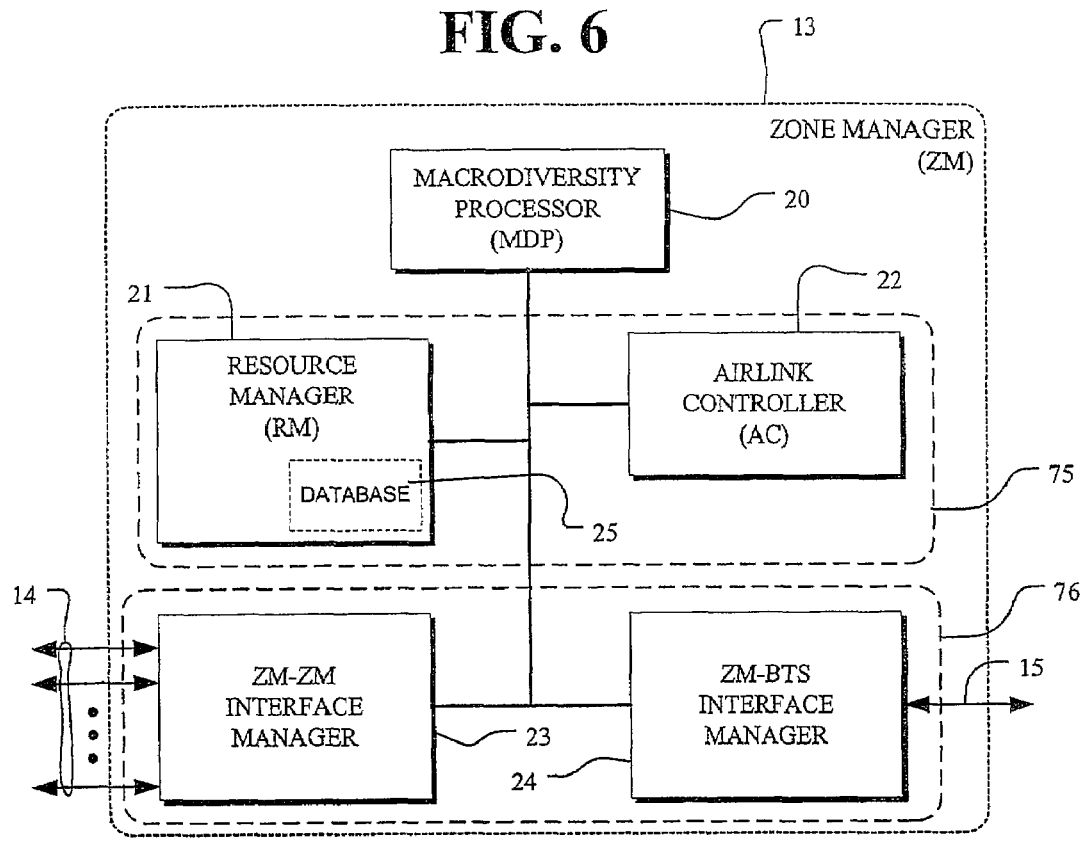
FIG. 6 depicts a schematic block diagram of a zone manager.

The function of each ZM 13 is to enable fast macrodiversity switching in the mobile wireless network. Its basic components are shown in FIG. 6. They are a macrodiversity processor (MDP) 20, control means 75 including resource manager, (RM) 21 and airlink controller (AC) 22, and interface means 76 including ZM-ZM interface manager 23 for the ZM-to-ZM links 14 and ZM-BTS interface manager 24 for the BTS-to-ZM transceiver link 15. The control means 75 issues broadcaster commands for controlling the down-link signals to each of selected ones of mobile stations and collector commands for controlling the plurality of macro-diverse collectors for changing the up-link signals for each of other selected ones of the mobile stations. Similar to the roles of host and assistant BTS, a distinction is made between host ZM and assistant ZM. A host ZM controls the fast macrodiversity switching services to the set of MS within the cell of the host BTS. An assistant ZM 13 provides fast macrodiversity switching services to the host ZM 13 for the same set of MS. Therefore, the role of a particular ZM 13 depends on the location of MS in the network. Any ZM 13 is a host ZM for the particular MS controlled by the host BTS and an assistant ZM for all other MSs.

In FIG. 6, the macrodiversity processor (MDP) 20 is a processor for processing the measurement and control signals used in controlling the fast macrodiversity switching of dedicated channels. The resource manager (RM) 21 functions to keep track of and control all of the resources, including BTS broadcasters and collectors, available used and unused channels and links, and other resources in the wireless network needed for fast macrodiversity switching. The airlink controller (AC) 22 is responsible for controlling the radio links among the BTSs and MSs via assistant ZMs and ZM-ZM links 14. The ZM-ZM interface manager 23 controls the ZM-to-ZM interface links 14 among zone managers 13 and supervises the zone manager network 55 of FIG. 4 for controlling the fast macrodiversity switching of dedicated channels. The ZM-BTS interface manager 24 functions to control the ZM-BTS link 15 between the ZM and BTS of a base station (BS).

The resource manager (RM) within the ZM 13 controls the radio resources for fast macrodiversity switching services. In a typical BTS, a number of transceivers (see 61-1, . . . , 61-T.sub.1 in FIG. 5) are installed to provide the radio links to an MS. In a BS.2 of FIG. 4, additional transceivers, called guest transceivers (see 61-1, . . . , 61-T.sub.2 in FIG. 5) are installed. These guest transceivers provide the additional radio resources useful in implementing fast macrodiversity switching. In the basic implementation, as discussed above, radio resources provided by the guest transceivers are managed by the RM 21, while the allocation of the host transceiver radio resources remains under BSC 16-1 control. The RM 21 keeps track of all used and idle host and guest radio resources available in its host BTS including the transceivers of FIG. 5. It receives radio link information, for example in the form of measurement reports and other information, either directly from its corresponding ZM or from other ZM in assistant BTSs via the ZM-to-ZM links 14. Since the transceiver stations communicate over a region containing one or more zones and the measurements are received from one or more collectors in the transceiver stations, the measurements from collectors include radio link conditions between a mobile station and the one or more collectors where the radio link information incorporates radio link conditions such as path loss, forward error rates, and carrier-to-interference ratio. The RM 21 in the host ZM also tracks radio resource usage in all assistant BTSs through communications with the RMs in the assisting BTSs. The RM 21 in the host BTSs stores and updates this information in a radio resource data base (DB) 25. During installation, all RMs are initialized with the identity of those BTSs in the network that are candidates for becoming assistant BTSs and the specific radio resources available in these BTSs. Alternatively, the ZM's may communicate with each other to determine the identity of assistant BTSs both at setup time and periodically during operation. When the MDP 20 requests a radio resource, the RM 21 checks the priority level of the request and the availability (in location, frequency, time slot or spreading code) of a radio resource suited to meet the request as stored in DB 25. If no such resource is available, or if the priority level of the request is insufficient, the request is denied. Otherwise, the radio resource is released and the data base 25 is updated accordingly. The assignment of the radio resource is also communicated to the other RMs in other ZMs for updating their respective data bases.

To perform the fast macrodiversity switching function, the ZM uses algorithms to track information in real time and to provide resource contention resolution, for the host BTS as well as for all assistant BTS for each MS. The ZM controls the outgoing information flow on the links 14 to other ZMs including the bandwidth resources of the links 14 between host BTS and assistant BTSs. The process of controlling the resources of the links 14 is analogous to the process of controlling the radio resources.

In one implementation, the host and guest transceivers form a pool of radio resources for assignment by both the ZM and the BSC, or by the ZM alone. In the latter case, the ZM is responsible for tracking and assigning radio resources for the host cell, both for normal traffic and for the fast macrodiversity switching service.

The MDP 20 provides several functions. One function of MDP 20 is to extract radio link quality measurements over the ZM-to-BTS data link for all the MSs in the host cell. These measurements are processed to determine when a need for fast macrodiversity switching services exists and what priority level is appropriate. Another function of the MDP 20 is to determine which of the assistant BTSs is best suited to provide the service. This function is done by transfer of measurements from the MDP 20 in one ZM 13 to other MDPs in the other ZMs. The MDP 20 then sends requests with a priority level for an appropriate radio resource and for link bandwidth to the RM 21. If the resource is available, the down-link traffic data is sent to the ZM-BTS interface manager 24 for transmission to the assistant BTS. Similarly, the AC 22 is instructed to make the radio resource available with configuration for fast macrodiversity switching. Similarly, on the up-link, the assistant BTS is instructed to receive up-link traffic from the MS on the identified radio link and to forward the traffic to the host BTS.

Another function of the MDP 20 is to monitor the control channels relayed by the host BTS. In the event of a MS or BSC originated handover, the MDP 20 may intervene with the handover process and continue fast macrodiversity switching services, or discontinue fast macrodiversity switching services with the MS 20 controlling the handover.

A further function of the MDP 20 is the control of the fast macrodiversity switching speed. Depending on the shadow fading statistics, as determined by the radio link measurements, the MDP 20 uses internal speed algorithms to optimize the fast macrodiversity switching speed.

Another function of the MDP 20, in some embodiments, is to provide aggregation services. These aggregation services are similar to fast macrodiversity switching functions and are performed using the ZMs. In aggregation, more than one transceiver is communicating with a particular MS. On the down-link, this operation consists of transmitting signals from more than one broadcaster to the particular MS using the same radio resource. This service is only possible with MSs that have the ability to receive the signals received separately and process the received signals to obtain a resulting down-link signal with a higher confidence level than any of the individual down-link signals. On the up-link, aggregation consists of receiving the particular MS signal in the collector of the host BTS, together with the MS signal with collectors located at assistant BTSs, transmitting these up-link signals to the MDP 20 in the host BTS via the ZM-to-ZM data links 14, and processing these signals to form a resulting up-link signal with a higher confidence level than any of the individual up-link signals.

The AC 22 provides the ZM 13 with the ability to set certain parameters of the up-link and down-link radio links between a guest transceiver and a MS using macrodiversity services. By way of example, the AC 22 has the ability to determine and set transmit power settings. When a guest transceiver is assisting another BS to provide a radio link to a MS, the AC 22 informs the transceiver providing the radio resource for the fast macrodiversity switching service of the initial power level. Similarly, the AC is responsible for timing advance and for synchronizing the data transfer on the up-link and down-link during fast macrodiversity switching operations.

The ZM-to-ZM links 14 of FIG. 6 are used in fast macrodiversity switching. Referring to FIG. 1, a hierarchical control structure routes traffic between the PSTN 121 via a mobile switching center (MSC) 117 to an MS 4 through one of a number of BSCs (like BSC 16-1 in FIG. 1) and then through one of an even larger number of BTSs 12. With fast macrodiversity switching, however, up-link and down-link traffic is also routed between BTSs 12 through operation of the zone managers 13. In addition to routing traffic for fast macrodiversity switching services, the ZM-to-ZM links 14 are used in the control of the fast macrodiversity switching process. This fast macrodiversity switching control function is distributed among the ZMs. The data exchange between ZMs for providing each other with the measurement, resource and other information needed for fast macrodiversity switching services, is carried over the ZM-to-ZM links 14. The control of this information flow is managed by the RM 25 in each of the ZMs, but the formatting, organization of the data and the actual transmission is controlled by ZM-ZM interface mangers 23 in a zone manager at each end of a ZM-to-ZM link 14.

In FIG. 6, the ZM-ZM interface manager 23 provides latency control and bandwidth management across the ZM-to-ZM links 14. The ZM-ZM interface manager 23 also contributes to fast macrodiversity switching decision by monitoring the link utilization and quality of service over the ZM-to-ZM links 14.

The ZM-to-BTS link 15 is used to transport voice or data traffic, connection set-up information, control information (for MDP, RM, and AC functions) and fast macrodiversity switching traffic forwarded to other ZMs and BTSs. The control of this data flow in both directions is formatted and organized by the ZM-BTS interface managers in each zone manager.

The benefit provided by fast macrodiversity switching to mobile network operators over or in addition to using power control, frequency hopping, smart antennas and repeaters, is based on the fact, that all dedicated channels are operated, at all times, using the radio link with the lowest available path loss. This operation makes it possible to set the MS and the BTS transmitters at the lowest possible power levels. When implemented in the entire network, this leads to a reduction in the interference level, allowing operators to change the frequency reuse patterns and increase network capacity and throughput.

Figure 7:
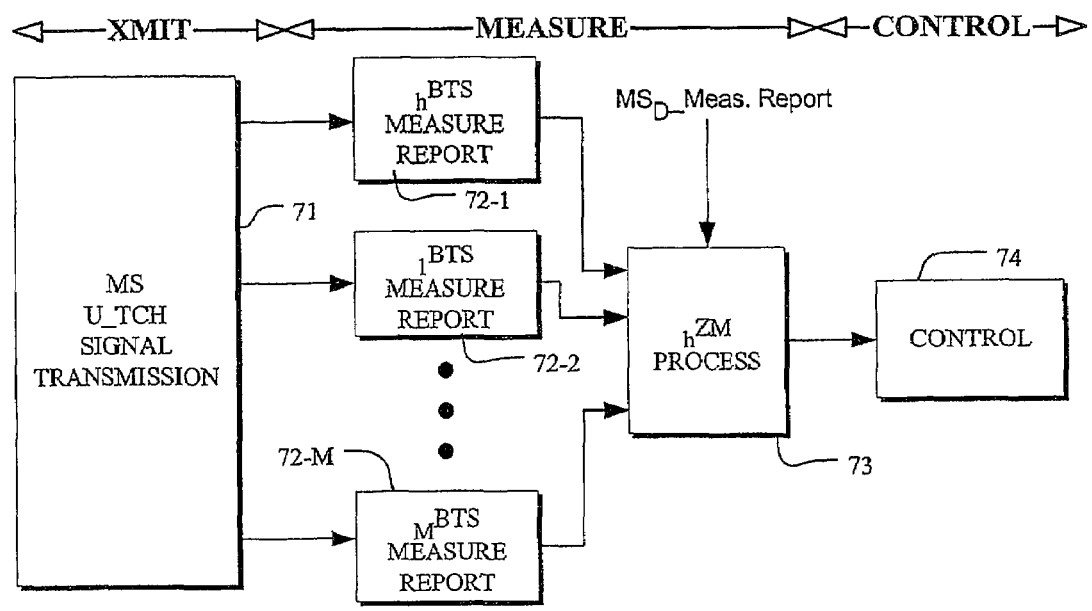
FIG. 7 depicts a representation of the measurement signal processing of a zone manager.

In FIG. 7, the steps by which measurement signals are generated and processed to form the processor information for controlling the fast macrodiversity switching are shown. FIG. 7, as implemented in FIG. 6, is a measurement unit and there is one for each zone manager. The MS U_TCH signal broadcast step 71 represents the traffic channel (TCH) up-link signals periodically generated by a typical mobile station MS in the wireless networks described in FIG. 1 through FIG. 4. Each zone manager within range detects these signals from a particular MS and processes the received U_TCH signal to form a measurement report. The measurement report includes information about the MS-BTS radio up-link path loss and the received signal quality. In particularly, a host base station, $_hBS$, makes a first measurement, Measure-1, indicated by the step 72-1. A first assistant base station, $_1BS$, makes a second measurement, Measure-2, indicated by the step 72-2. Finally a $M^{th}$ base station, $_mBS$, makes an $M^{th}$ measurement, Measure-M, indicated by step 73-M.

In FIG. 7, the measurements from the steps 72-2, ..., 72-M are all forwarded via the assistant zone managers 13 over links 14. (See FIG. 2 through FIG. 7) to the host zone manager $_hZM$. The measurement reports from steps 72-1, ..., 72-M are derived, for example, from the up-link TCH signal transmission by a particular one of the MSs. In addition, to the TCH measurement reports, the measurement report "$MS_D\_$ Meas. Report" is also received by the host zone manager, $_hZM$, and is input to the $_hZM$ process step 73 for use in measurement signal processing. The measurement signals are processed in step 73 to provide outputs to the control step 74 which determines what control action should be taken. The processing steps of FIG. 7 are performed by the macrodiversity processor 20 in cooperation with the other components in the ZM 13 of FIG. 7.

Figure 8:
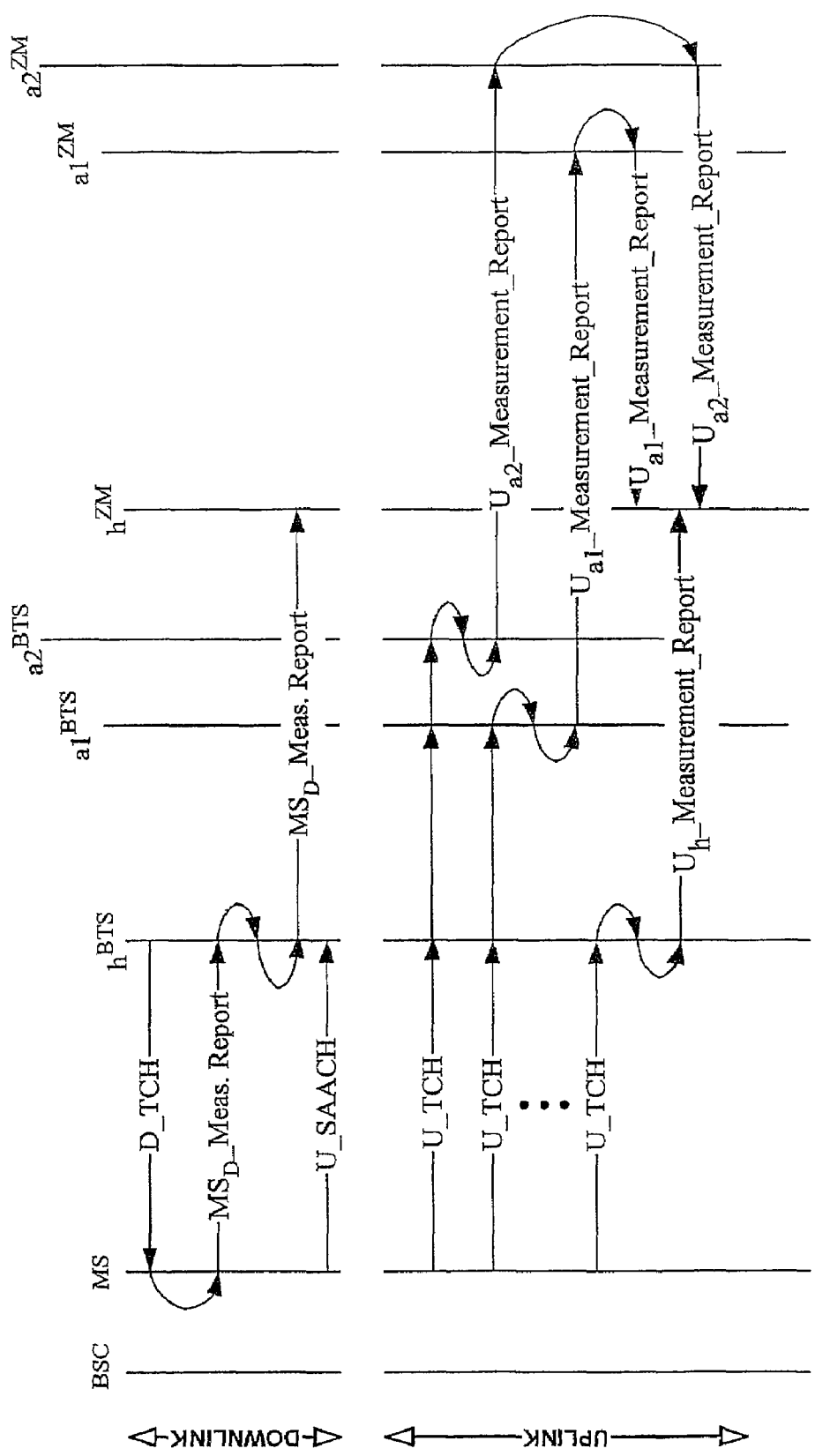
FIG. 8 depicts a representation of signals used in generating the measurement information used in the FIG. 7 processing.

In FIG. 8, signals which are generated in the wireless network of FIG. 1 are shown. The different components generating or receiving signals include one particular MS and for that particular MS, a host base station, $_hBTS$, a first assistant base station, $_{a1}BS$, a second assistant station $_{a2}BS$, a host zone manager, $_hZM$, a first assistant zone manager, $_{a1}ZM$, and a second assistant zone manager, $_{a2}ZM$. In operation of a wireless network, a transmitted TCH signal (D_TCH) is received by the particular MS. The MS, after receiving an appropriate number of D_TCH signals, generates a measurement report, $MS_D\_$ Meas. Report, which is transmitted on an up-link slow associated control channel (U_SACCH) to the host $_hBTS$. The $_hBTS$ in turn transmits the measurement report, $MS_D\_$ Meas. Report, to the host zone manager, $_hZM$.

During the down-link operations that generate the $MS_D\_$ Meas. Report, the MS is transmitting an up-link TCH signals, U_TCH. Each transmitted TCH signal from the MS is detected by the base transceiver stations within range including, in the FIG. 8 example, the $_hBTS$, the $_{a1}BTS$ and the $_{a2}BTS$. Each BTS generates a measurement report including the $U_h\_$Measurement_Report, $U_{a1}\_$Measurement_Report and the $U_{a2}\_$Measurement_Report in response to a number of U_TCH transmitted from the particular MS. Each of these measurement reports are directed to the corresponding zone manager including the $_hZM$, $_{a1}ZM$ and $_{a2}ZM$ zone managers, respectively. Each assistant zone manager, namely $_{a1}ZM$ and $_{a2}ZM$, forward the measurement reports to the host zone manager, $_hZM$. As indicated in FIG. 7, the $_hZM$ process 73 processes each of the measurement reports.

Figure 9:
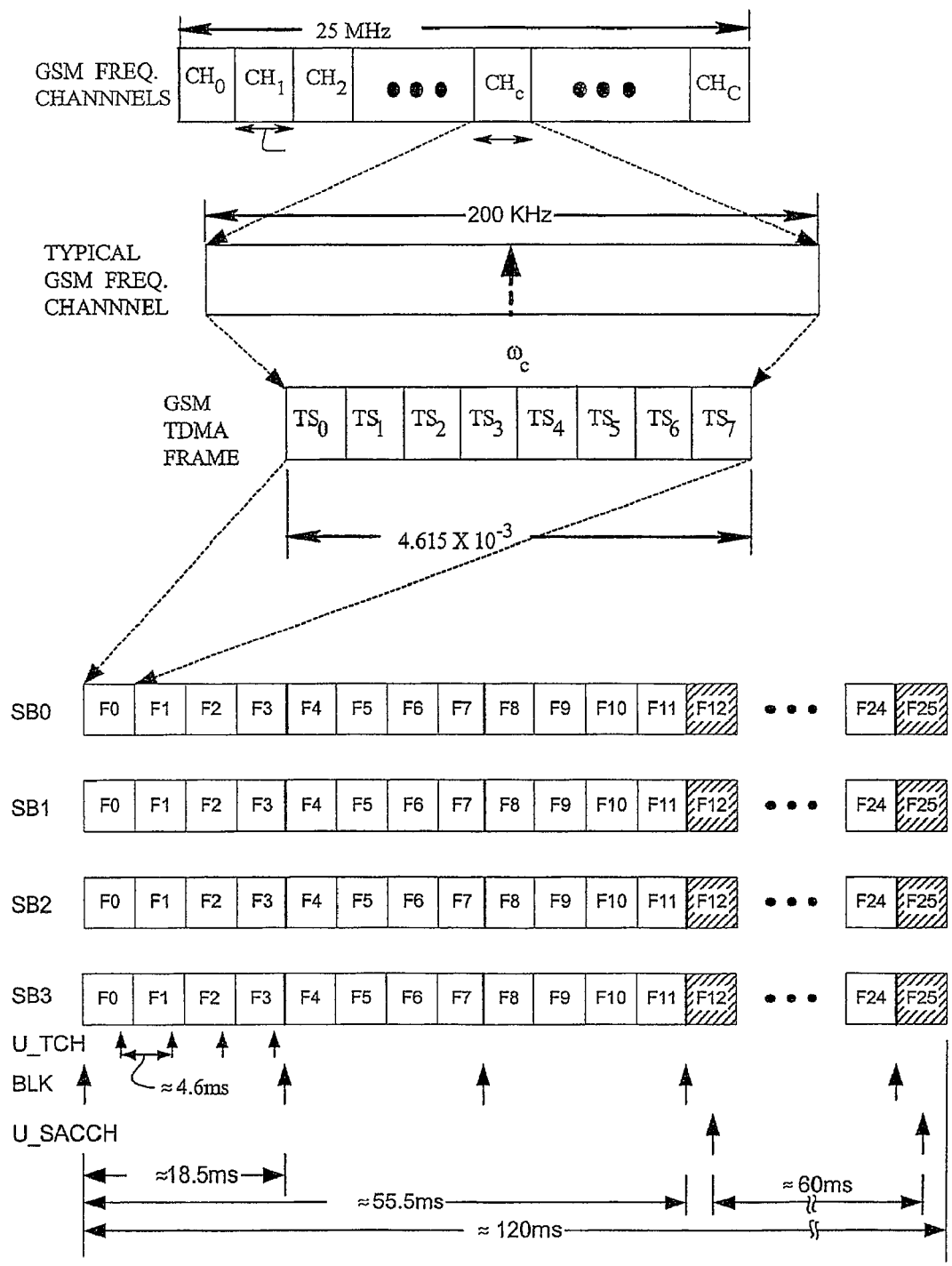
FIG. 9 depicts a representation of signal timing for generating measurement signals in a GSM system.

In FIG. 9, a further representation of signals in a GSM system are shown. For example, the 800-900 MHz wireless spectrum, the GSM frequency channels occur in 25 MH$_z$ bands including and the channels $CH_0$, $CH_1$, $CH_2$, ..., $CH_c$, ..., $CH_C$. Each one of the channels, such as typical channel $CH_c$, includes a 200 KHz band which represents a typical GSM frequency channel with a center frequency $\omega_c$. Each GSM frequency channel is further divided into eight time slots in a GSM TDMA frame including the time slots $TS_0, TS_1, \ldots, TS_7$. The GSM TDMA frame is (approximately $60/13 \times 10^{-3}$ second). Each set of four frames forms a block. Each successive group of 26 GSM TDMA frames forms a superblock and superblocks SB0, SB1, SB2 and SB3 are shown in FIG. 9. Four successive superblocks, such as SB0, ..., SB3, together form one SACCH multiframe. After a set of three blocks, a SACCH frame occurs so that there are two SACCH frames, at F12 and F25, in each superblock, SB. Of these two SACCH frames, one is usually idle and the other contains the SACCH data including down-link measurement reports.

In FIG. 9, the TCH signals, U_TCH, for any particular MS are generated in the time slot for the MS which occurs once for each TDMA frame at the TDMA frame rate. Accordingly, as shown in FIG. 9, U_TCH signals for a particular MS are generated approximately each 4.6 ms at the TDMA frame rate. Therefore, each block of four frames, for example frames F0, F1, F2 and F3, generates four U_TCH signals in a block period of approximately 18.5 ms. In the next frame after three blocks of frames, a SACCH signal is generated and is indicated in FIG. 9 as the U_SACCH signals that occur approximately every 60 ms. Although a U_SACCH signal is generated every 60 ms as indicated in FIG. 9, the actual measurement data determined by any particular MS is interleaved for transmission among eight SACCH frames. Accordingly, the measurement data for any particular measurement made by a particular MS is not available until after four superblocks, such as SB0, SB1, SB2 and SB3 in FIG. 9, are received. Each superblock is approximately 120 ms so that the four superblocks require 480 ms. Accordingly, the $MS_D$_Meas. Report, as shown in FIG. 7 is only available once every 480 ms while the U_TCH measurement signals are available approximately every 4.6 ms.

Figure 10:
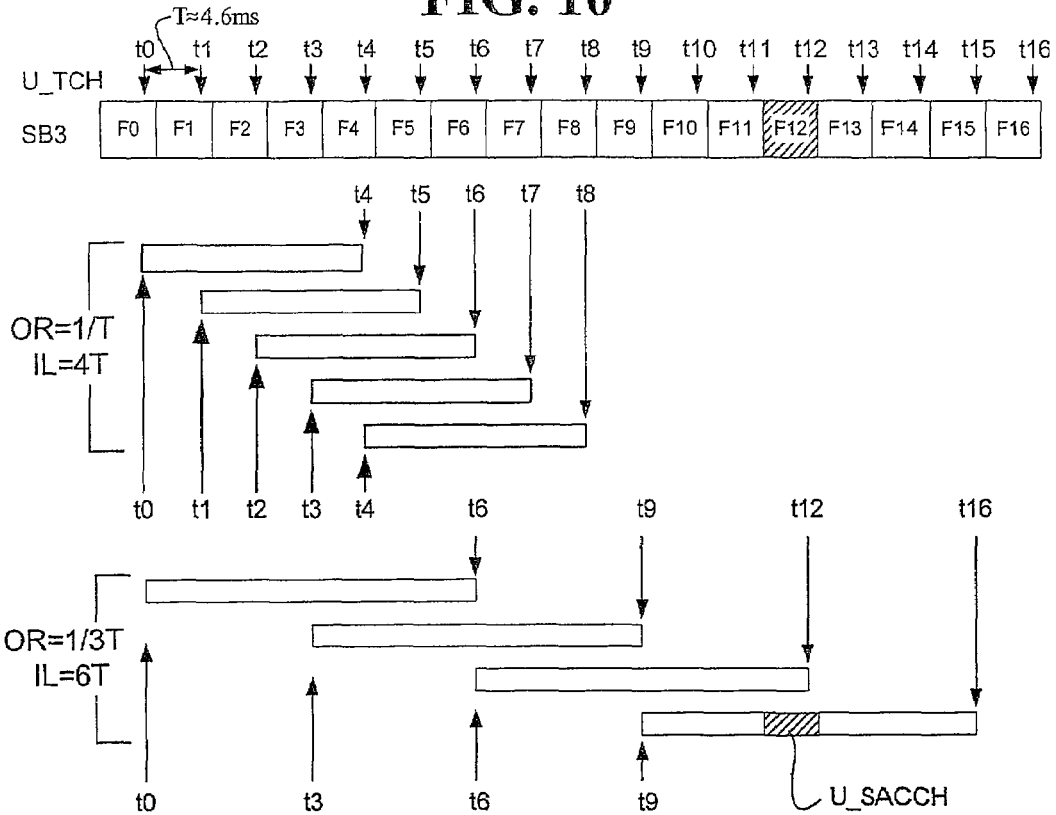
FIG. 10 depicts a representation of signal timing for generating measurement reports based upon the measurement signals of FIG. 9.

In FIG. 10, an example of fast macrodiversity measurement and switching operations is shown for the measurement signals of FIG. 9. The host $_h$BS and the assistant $_{a1}$BS, ..., $_{aa}$BS (see FIG. 1 through FIG. 4) each measure signal quality at a measurement signal rate, 1/T, that is, every time a dedicated up-link burst (U_TCH, FIG. 9) is received. In FIG. 9, the U_TCH have the burst period, T, equal to approximately 4.6 ms. In FIG. 10, the burst period, T, occurs at times t0, t1, ..., t16, ... when the U_TCH or U_SACCH bursts are transmitted by an MS. In the embodiment of FIG. 10, each burst received from an MS at about every T=4.6 ms is measured by the ZMs for signal strength or other quality parameter at the measurement signal rate. The ZMs integrate each of these measurements over an integration length (IL) using a sliding time window to form an integrated measurement report and output these integrated measurement reports at an output rate (OR). The IL and OR values are variable numbers controlled either by the ZM affiliated with the BS making the measurements or centrally, for example, by the $_h$ZM. The values of OR and IL can be fixed for all calls or can be individually adaptive in response to specific MS conditions such as shadow fading time scale and mobile speed for each call in progress.

FIG. 10 shows two examples of integrated measurement reporting based upon measurement signals occurring at the measurement signal rate of 1/T. In the upper example, integration is over four consecutive burst measurements of period T so that IL=4 and reports are generated at the burst rate so that OR=1/T. In the lower example, integration is over six consecutive burst measurements so that IL=6 and reports are generated at the rate of every three bursts so that OR=⅓T.

In the example of FIG. 10 where OR=1/T and IL=4 T, at times t0, t1, t2 and t3, each U_TCH signal is detected and measured by the host and assistant BTS and each provides an integrated measurement report, namely, the $U_h$_Measurement_Report, the $U_{a1}$_Measurement_Report and the $U_{a2}$_Measurement_Report, as indicated in FIG. 8, at time t4. Similarly, at times t1, t2, t3 and t4, each U_TCH signal is detected and measured by the host and assistant BTS and each provides an integrated measurement report, namely, the $U_h$_Measurement_Report, the $U_{a1}$_Measurement_Report and the $U_{a1}$_Measurement_Report, as indicated in FIG. 8, at time t5. Similarly, at times t2, t3, t4 and t5, each U_TCH signal is detected and measured by the host and assistant BTS and each provides an integrated measurement report, namely, the $U_h$_Measurement_Report, the $U_{a1}$_Measurement_Report and the $U_{a2}$_Measurement_Report, as indicated in FIG. 8, at time t6. This measurement and integration process repeats so that measurement reports are obtained at times t4, t5, t6, t7, t8, ... and so on, that is at approximately the TDMA frame rate.

In the example of FIG. 10 where OR=⅓T and IL=6 T, at times t0, t1, t2, t3, t4 and t5, each U_TCH signal is detected and measured by the host and assistant BTS and each provides an integrated measurement report (IMR), namely, the $U_h$_Measurement_Report, the $U_{a1}$_Measurement_Report and the $U_{a2}$_.Measurement_Report, as indicated in FIG. 8, at time t6. Similarly, at times t3, t4, t5 t6, t7 and t8, each U_TCH signal is detected and measured by the host and assistant BTS and each provides an integrated measurement report, namely, the $U_h$_Measurement_Report, the $U_{a1}$_Measurement_Report and the $U_{a2}$_Measurement_Report, as indicated in FIG. 8, at time t9. Similarly, at times t6, t7, t8, t9, t10 and t11, each U_TCH signal is detected and measured by the host and assistant BTS and each provides an integrated measurement report, namely, the $U_h$_Measurement_Report, the $U_{a1}$_Measurement_Report and the $U_{a2}$_Measurement_Report, as indicated in FIG. 8, at time t12. This measurement and integration process repeats so that measurement reports are obtained at times t6, t9, t12, t7, t16, ... and so on, that is, approximately at one third the TDMA frame rate. Note that at time t12, the U_SACCH burst is used in the calculation as the equivalent of a U_TCH burst for purposes of the measurement report since the U_TCH and U_SACCH have the same broadcast power level. If signals of different power levels or other attributes are present, then the measurement algorithms of macrodiversity processor 20 of FIG. 6 accommodate for the differences so that signals of like properties are processed.

In FIG. 10, the measurement reports, $U_h$_Measurement_Report, $U_{a1}$_Measurement_Report and $U_{a2}$_Measurement_Report are integrated measurement reports, generated by each zone manager measurement unit, transmitted to the $_h$ZM via the ZM-to-ZM links 14 of FIG. 6. The macrodiversity processor 20, in FIG. 6, of the $_h$ZM compares these measurement reports and decides which BS should be used to communicated with any particular MS for traffic and control. Before switching traffic or control over to an another one of the BS, the macrodiversity processor 20 consults with the resource manager 21 for availability of radio resources in another one of the BS, for contentions with other radio resource requests in that BS, and for availability of ZM-to-ZM link bandwidth over links 14. Only after the resource manager 21 has approved the switch and after a radio resource has been reserved based on availability and priority level and configured in the BS, is the traffic or control switched over to the another one of the BS.

A number of different algorithms may be used by the macrodiversity processor 20 in the $_h$ZM to make the switching decisions. By way of example, the decision may be based on making a number k of measurement report comparisons, where k is at least one. If after k such measurement report comparisons, an alternate BS has a lower path loss or other quality factor than the currently serving BS, than a switch is made to the alternate BS.

Operation of the fast macrodiversity switching is explained in connection with the following TABLE 1 which depicts the fast macrodiversity switching as indicated in switching from the FIG. 2 standard GSM configuration to a FIG. 3 configuration.

TABLE 1 gives an example of this decision process. In addition to generating its own integrated measurement reports (IMR), the $_h$ZM in the $_h$BS receives integrated measurement reports from three assistant BSs. The TABLE 1 lists a sequence of 17 such report intervals. The three columns in the center give sample values of these IMRs. As can be seen by the highlighted IMRs, at time step 4, $_{a1}$BS reports a higher value, 16, than the $_h$BS value of 15. Assuming that a higher value is indicative of a better radio link to the MS, and assuming that two consecutive higher reports are used to effect a switch, the a decision is made at time step 5 to switch the dedicated channels to $_{a1}$BS since $_{a1}$BS for the second consecutive time reports a higher value, 18, than the $_h$BS value of 14. As the MS continues to move, IMRs from $_{a2}$BS become larger. At time steps 15 and 16, the condition for two consecutive larger IMRs from $_{a2}$BS is fulfilled and the $_h$ZM switches the dedicated channels over to $_{a2}$BS.

TABLE 1

| IMR Sequence at Rate OR | $_h$BS IMR | $_{a1}$BTS IMR | $_{a2}$BTS IMR | $_{a3}$BTS IMR | Switching Decision Basis k = 2 IMRs |
|---|---|---|---|---|---|
| 1 | 25 | 11 | 6 | 3 | |
| 2 | 25 | 14 | 5 | 3 | |
| 3 | 18 | 15 | 4 | 2 | |
| 4 | *15* | *16* | 4 | 1 | |
| 5 | *14* | *18* | 3 | 1 | Switch to $_{a1}$BTS |
| 6 | 12 | 20 | 4 | — | |
| 7 | 12 | 21 | 6 | — | |
| 8 | 13 | 20 | 8 | — | |
| 9 | 14 | 21 | 10 | 1 | |
| 10 | 14 | 18 | 11 | 3 | |
| 11 | 13 | 20 | 13 | 5 | |
| 12 | 12 | 16 | 14 | 7 | |
| 13 | 10 | 14 | 13 | 6 | |
| 14 | 7 | 14 | 14 | 7 | |
| 15 | 2 | *13* | *16* | 8 | |
| 16 | 2 | *11* | *17* | 9 | Switch to $_{a2}$BTS |
| 17 | — | 11 | 16 | 8 | |

The switching decision algorithm may also take into account the down-link measurement reports provided by the SACCH as shown in FIG. 8. For example, in a GSM network, these reports are available at 480 ms intervals.

Figure 11:
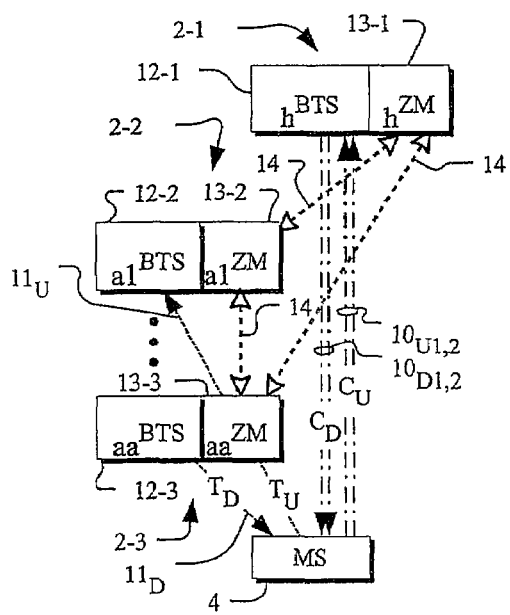
FIG. 11 depicts a wireless network formed of multiple base transceiver stations (BTSs) and multiple zone managers (ZMs) where control communications are between a host BTS and an MS while traffic communications are between assistant BTSs, all under control of a host zone manager and assistant zone managers.

In FIG. 11, the $_h$BTS 12-1 and the corresponding $_h$ZM 13-1 are the host BTS and the host ZM forming the host BS 2-1 for the MS 4. The relationship between the BTS 12-1 and the MS 4 of FIG. 11, however, is not like that for a standard GSM system. In FIG. 11, the traffic communication is on dedicated channels that have been switched to be between the assistant $_{a1}$BTS 12-2 in the assistant BS 2-2 and the MS 4 for the up-link traffic, $T_U$, on link 11$_U$ and has been switched to assistant $_{aa}$BTS 12-3 in the assistant BS 2-2 for the down-link traffic, $T_D$, on link 11$_D$. The control channels include the down-link control, $C_D$, on link 10$_{D1,2}$, and the up-link control, $C_U$, on link 10$_{U1,2}$. The down-link control channel, $C_D$, has two components, a down-link broadcast control channel on link 10$_{D1}$ and a dedicated down-link control channel on link 10$_{D2}$. The up-link control channel, $C_U$, has two components, an up-link control channel on link 10$_{U1}$ and a dedicated up-link control channel on link 10$_{U2}$. The control channels, including the down-link control, $C_D$, and the up-link control, $C_U$, remain between host $_h$BTS 12-1 and MS 4. In the FIG. 11 embodiment, the links 10$_{D1}$ and 10$_{D2}$ can be a common link since they connect between the same resources. In other embodiments (see FIG. 3), the control channel on link 10$_{D2}$ is switched as a dedicated channel. Although MS 4 is under control of the host $_h$BTS 12-1, the assistant BTSs including $_{a1}$BTS 12-2 and $_{aa}$BTS 12-3, associated with the assistant zone managers $_{a1}$ZM 13-2 and $_{aa}$ZM 13-3, participate directly for the traffic with MS 4.

Figure 12:
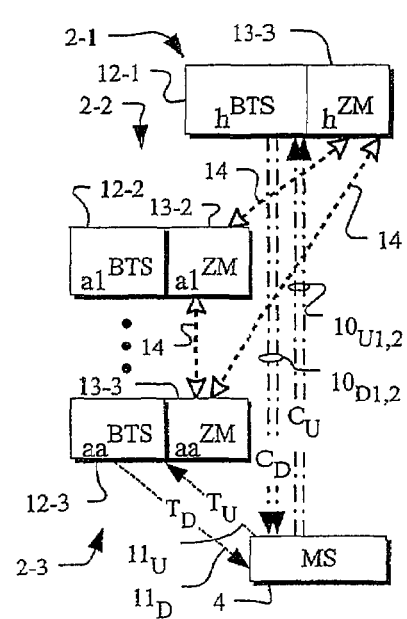
FIG. 12 depicts a wireless network formed of multiple base transceiver stations (BTSs) and multiple zone managers (ZMs) where control communications are between a host BTS and an MS while traffic communications are between assistant BTSs, different than in FIG. 11, all under control of a host zone manager and assistant zone managers.

In FIG. 12, the $_h$BTS 12-1 and the corresponding $_h$ZM 13-1 remain as the host $_h$BTS and the host $_h$ZM forming the host BS 2-1 for the MS 4. The relationship between the $_h$BTS 12-1 and the MS 4 of FIG. 12, however, is not like that for a standard GSM system. The traffic communication is on dedicated channels and has been switched between the assistant $_{aa}$BTS 12-3 and the MS 4 for the up-link traffic, $T_U$, on link 11$_U$ and also has been switched to assistant $_{aa}$BTS 12-3 for the down-link traffic, $T_D$, on link 11$_D$. The control channels include the down-link control, $C_D$, on link 10$_{D1,2}$, and the up-link control, $C_U$, on link 10$_{U1,2}$. The down-link control channel, $C_D$, has two components, a down-link broadcast control channel on link 10$_{D1}$ and a dedicated down-link control channel on link 10$_{D2}$. The up-link control channel, $C_U$, has two components, an up-link control channel on link 10$_{U1}$ and a dedicated up-link control channel on link 10$_{U2}$. The control channels, including the down-link control, $C_D$, and the up-link control, $C_U$, remain between host $_h$BTS 12-1 and MS 4. In the FIG. 11 embodiment, the links 10$_{D1}$ and 10$_{D2}$ can be a common link since they connect between the same resources. In other embodiments (see FIG. 3), the control channel on link 10$_{D2}$ is switched as dedicated channel. Although MS 4 is under control of the host $_h$BTS 12-1, the assistant $_{aa}$BTS 12-3, associated with the assistant zone managers $_{aa}$ZM 13-3, participates directly for the traffic with MS 4.

While the invention has been particularly shown and described with reference to preferred embodiments thereof it will be understood by those skilled in the art that various changes in form and details may be made therein without departing from the scope of the invention.

The invention claimed is:

1. An apparatus comprising:
   a zone manager including:
   an interface unit configured to receive measurement information one or more additional zone managers and from a corresponding transceiver, wherein the zone manager is configured to act as a host zone manager for at least one mobile station configured to transmit unlink signals to and receive downlink signals from a communications system, the communications system including the host zone manager and the one or more additional zone managers, and wherein the one or more additional zone managers are configured to act as assistant zone managers for the host zone manager;
   a processing unit configured to process said measurement information to determine preferred ones of a plurality of transceivers to provide dedicated channels for communication with the mobile station, wherein communication over said dedicated channels includes the use of a first radio resource, and wherein the plurality of transceivers includes the corresponding transceiver and one or more additional transceivers each associated with a corresponding one of the one or more additional zone managers; and a control unit configured to dynamically switch said dedicated channels between said preferred ones of the plurality of transceivers during communication with the mobile station over said dedicated channels, wherein said dynamic switching is performed without changing the first radio resource.

2. The apparatus as recited in claim 1, wherein said measurement information is based on up-link signals transmitted from said mobile station.

3. The apparatus as recited in claim 1, wherein a plurality of zone managers including the host zone manager and the one or more additional zone managers are interconnected with each other in order to form a network.

4. The apparatus as recited in claim 3, wherein, during communications with a particular one of a plurality of mobile stations, one of said plurality of zone managers is configured to act as a host zone manager and one or more additional ones of the zone managers act as assistant zone managers, wherein a zone manager acting as a host zone manager for the particular one of the plurality of mobile stations is configured to communicate over broadcast channels with said particular one of the plurality of mobile stations while particular dedicated channels associated with said particular one of the plurality of mobile stations are dynamically switched among the zone managers acting as said assistant zone managers and said host zone manager for said particular one of said plurality of mobile stations.

5. The apparatus as recited in claim 1, wherein said control unit is configured to switch said dedicated channels based on an indication received from said processing unit.

6. The apparatus as recited in claim 1, wherein said control unit is configured to issue broadcaster commands for controlling the downlink signals to each of selected ones of a plurality of mobile stations and further configured to issue collector commands for controlling a plurality of macrodiverse collectors for changing the uplink signals for each of other selected ones of said plurality of mobile stations.

7. The apparatus as recited in claim 1, wherein the communication system and the mobile station are each configured to transmit said wireless signals based on multiple access protocols.

8. The apparatus as recited in claim 7, wherein the communication system and the mobile station are each configured to transmit said wireless signals based on TDMA protocols.

9. The apparatus as recited in claim 7, wherein the communication system and the mobile station are each configure to transmit said wireless signals based on CDMA protocols.

10. The apparatus as recited in claim 7, wherein the communication system and the mobile station are each configured to transmit said wireless signals based on SDMA protocols using smart antennas.

11. The apparatus as recited in claim 7, wherein the communication system and the mobile station are each configured to transmit said wireless signals based on FDMA protocols.

12. The apparatus as recited in claim 1, wherein each of said plurality of transceivers is configured to communicate over a region containing one or more zones and wherein said measurement information is based upon measurements from one or more collectors in one or more of said plurality of transceiver.

13. The apparatus as recited in claim 1, wherein each of said plurality of transceivers include broadcaster controllers configured to control broadcaster transmitters, wherein a broadcaster controller associated with the host zone manager is configured to select one or more broadcaster transmitters for forward communications with the mobile station based on information received from said processing unit.

14. The apparatus as recited in claim 2, wherein said processing unit is configured to integrate a plurality of measurements over an integration length and further configured to form integrated measurement reports.

15. The apparatus as recited in claim 2, wherein at least a portion of said measurement information is based on uplink signals received by collectors at macrodiverse locations.

16. The apparatus as recited in claim 15, wherein said measurement information is based on at least one of the following types of measurements:
    signal strength measurements;
    error rate measurements;
    distance measurements indicating a distance between the mobile station and one or more of the plurality of transceivers.

17. The apparatus as recited in claim 15, wherein said measurement information includes information regarding radio link conditions between the mobile station and one or more of the plurality of transceivers, wherein said information regarding radio link conditions include one or more of the following types of information:
    path loss information;
    forward error rate information;
    carrier to interference ratio information.

18. The apparatus as recited in claim 15, wherein the zone manager and each of the one or more additional zone managers is associated with a corresponding measurement unit each configured to perform measurements upon which said measurement information is generated.

19. The apparatus as recited in claim 1, wherein the control unit is coupled to the processing unit, and wherein the control unit includes a resource manager and an airlink controller.

20. The apparatus as recited in claim 19, wherein the resource manager is configured to control a plurality of radio sources for communications with a plurality of mobile stations, wherein said controlling includes enabling dynamic switching of dedicated channels among the plurality of transceivers.

21. The apparatus as recited in claim 19, wherein the resource manager is configured to track usage of all radio resources available to the corresponding transceiver.

22. The apparatus as recited in claim 19, wherein, wherein the processing unit is configured to generate a resource request, and wherein, responsive to the request, the resource manager is configured to check a priority level of the request and availability of a particular radio resource capable of meeting the request.

23. The apparatus as recited in claim 22, wherein the resource manager includes a database configured to store usage information pertaining to the radio resources available to the corresponding transceiver, and wherein the resource manager is configured to update the database responsive to the resource manager granting the request.

24. The apparatus as recited in claim 20, wherein the first radio resource is one of the plurality of radio resources, and wherein each of the plurality of radio resources comprise one of the following combinations:
    a frequency and time slot combination;
    a frequency and spreading code combination.

25. The apparatus as recited in claim 19, wherein the airlink controller is configured to control radio links between one or more of the plurality of transceivers and the mobile station, and wherein the airlink controller is further configured to control radio links between one or more additional mobile stations and one or more of the plurality of transceivers.

26. The apparatus as recited in claim 1, wherein the interface unit is coupled to the control unit and the processing unit, wherein the interface unit includes a zone manager-to-zone manager interface unit configured to provide an interface between the zone manager and at least one of the one or more additional zone managers, and a transceiver interface unit configured to provide an interface to the corresponding transceiver.

27. The apparatus as recited in claim 1, wherein the processing unit is configured to monitor one or more control channels, wherein said control channels include dedicated control channels and broadcast control channels.

28. The apparatus as recited in claim 1, wherein the processing unit is configured to control dynamic switching speed.

29. The apparatus as recited in claim 1, wherein the processing unit is configured to control aggregation when two or more of the plurality of transceivers are communicating with the mobile station.

30. The apparatus as recited in claim 1, wherein the processing unit is configured to extract radio link quality measurements for the mobile station based on said measurement information.

31. The apparatus as recited in claim 1, wherein the processing unit is configured to compare measurement information for the corresponding transceiver and at least one additional one of the plurality of transceivers in order to determine said preferred ones of a plurality of transceivers to provide dedicated channels for communication with the mobile station.

32. The apparatus as recited in claim 31, wherein the processing unit is configured to determine to switch a dedicated channel from a first one of the plurality of transceivers to a second one of the plurality of transceivers based on two consecutive measurement reports indicating that the second one of the plurality of transceivers provides a higher quality radio link than the first one of the plurality of transceivers.

33. The apparatus as recited in claim 1, wherein the zone manager is configured to act as a host zone manager for one or more additional mobile stations.

34. The apparatus as recited in claim 1, wherein the zone manager is configured to act as an assistant zone manager for at least one of the one or more additional zone managers.

35. The apparatus as recited in claim 1, wherein the communications system is a cellular communications system, and wherein the mobile station is a mobile cellular communications device.

36. The apparatus as recited in claim 35, wherein the mobile cellular communications device is a mobile telephone.

37. The apparatus as recited in claim 1, wherein the zone manager is co-located with the corresponding transceiver.

38. The apparatus as recited in claim 1, wherein the zone manager is implemented in a base station controller, and wherein each of the one or more additional zone managers are also implemented in the base station controller.

39. A method comprising:
receiving, at a host zone manager, measurement information from a corresponding transceiver and from one or more assistant host zone managers;

the host zone manager processing the measurement information to determine preferred ones of a plurality of transceivers to be used in providing dedicated channels for communication with a mobile station, wherein communication over said dedicated channels includes the use of a first radio resource, and wherein the plurality of transceivers includes the corresponding transceiver and one or more additional transceivers each associated with a corresponding one of the one or more assistant zone managers; and the host zone manager dynamically switching, based on said processing, said dedicated channels between said preferred ones of the plurality of transceivers during communication with the mobile station over said dedicated channels, wherein said dynamic switching is performed without changing the first radio resource.

40. The method as recited in claim 39, wherein at least a portion of said measurement information is based on uplink signals received by collectors at macrodiverse locations.

41. The method as recited in claim 40, wherein said measurement information is based on at least one of the following types of measurements:
signal strength measurements;
error rate measurements;
distance measurements indicating a distance between the mobile station and one or more of the plurality of transceivers.

42. The method as recited in claim 40, wherein said measurement information includes information regarding radio link conditions between the mobile station and one or more of the plurality of transceivers, wherein said information regarding radio link conditions include one or more of the following types of information:
path loss information;
forward error rate information;
carrier to interference ratio information.

43. The method as recited in claim 39, further comprising controlling a plurality of radio resources for communications with a plurality of mobile stations, wherein said controlling includes enabling dynamic switching of dedicated channels among the plurality of transceivers.

44. The method as recited in claim 43 further comprising tracking usage of all radio resources available to the corresponding transceiver.

45. The method as recited in claim 43, further comprising generating a resource request and, responsive to the request, checking a priority level of the request and an availability of a particular radio resource capable of meeting the resource request.

46. The method as recited in claim 45, further comprising storing, in a database, usage information pertaining to each of the plurality of radio resources available to the corresponding transceiver.

47. The method as recited in claim 46, further comprising updating the database responsive to granting the resource request.

48. The method as recited in claim 43, wherein the first radio resource is one of the plurality of radio resources, and wherein each of the plurality of radio resources comprise one of the following combinations:
a frequency and time slot combination;
a frequency and spreading code combination.

49. The method as recited in claim 39, further comprising controlling radio links between one or more of the plurality of transceivers and the mobile station, and further comprising controlling radio links between one or more of the plurality of transceivers and one or more additional mobile stations.

50. The method as recited in claim 39, further comprising monitoring one or more control channels, wherein the control channels include dedicated control channels and broadcast control channels.

51. The method as recited in claim 39, further comprising controlling dynamic switching speed.

52. The method as recited in claim 39, further comprising controlling aggregation, wherein during said aggregation, two or more of the plurality of transceivers are communicating with the mobile station.

53. The method as recited in claim 39, further comprising extracting radio link quality measurements for the mobile station based on said measurement information.

54. The method as recited in claim 39 further comprising comparing measurement information for the corresponding transceiver and at least one additional one of the plurality of transceivers in order to determine preferred ones of the plurality of transceivers to provide dedicated channels for communication with the mobile station.

55. The method as recited in claim 54, further comprising determining to switch a dedicated channel from a first one of the plurality of transceivers to a second one of the plurality of transceivers based on two consecutive measurement reports indicating that a second one of the plurality of transceivers provides a higher quality radio link than the first one of the plurality of transceivers.

56. The method as recited in claim 39, further comprising the host zone manager acting as a host for one or more additional mobile stations.

57. The method as recited in claim 39, further comprising the host zone manager acting as an assistant zone manager for one or more additional zone managers.

58. The method as recited in claim 39, wherein the host zone manager and the one or more assistant zone managers are part of a cellular communications system, and wherein the mobile station is a mobile cellular device.

59. The method as recited in claim 58, wherein the mobile station is a mobile telephone.

60. A communications station comprising:
a transceiver including one or more broadcasters and one or more collectors, wherein the broadcasters are configured to transmit downlink signals to a mobile station, and wherein the collectors are configured to receive uplink signal from the mobile station, wherein the transceiver is one of a plurality of transceivers in a communications system;
a zone manager coupled to the transceiver, wherein the zone manager is configured to act as a host zone manager for communications with the mobile station, and wherein the zone manager is configured to:
receive measurement information from the transceiver and from each of one or more additional zone managers acting as assistant zone managers, wherein each of the additional zone managers is associated with a corresponding one of the plurality of transceivers;
process the measurement information in order to determine preferred ones of the plurality of transceivers to provide dedicated channels for communication with the mobile station wherein communication over said dedicated channels includes the use of a first radio resource; and
dynamically switch said dedicated channels between said preferred ones of the plurality of transceivers during communication with the mobile station over said dedicated channels, wherein said dynamic switching is performed without changing the first radio resource.

61. The communications station as recited in claim 60, wherein at least a portion of said measurement information is based on uplink signals received by collectors at macrodiverse locations, wherein each of the collectors is associated with a corresponding one of the plurality of transceivers.

62. The communications station as recited in claim 61, wherein said measurement information is based on at least one of the following types of measurements:
signal strength measurements;
error rate measurements;
distance measurements indicating a distance between the mobile station and one or more of the plurality of transceivers.

63. The communications station as recited in claim 61, wherein said measurement information includes information regarding radio link conditions between the mobile station and one or more of the plurality of transceivers, wherein said information regarding radio link conditions include one or more of the following types of information:
path loss information;
forward error rate information;
carrier to interference ratio information.

64. The communications station as recited in claim 60, wherein the zone manager includes:
an interface unit configured to couple the zone manager to the transceiver and to one or more of the additional zone managers;
a processing unit configured to process the measurement information; and
a control unit configured to perform said dynamic switching.

65. The communications station as recited in claim 64, wherein the control unit includes a resource manager and an airlink controller.

66. The communications station as recited in claim 65, wherein the resource manager is configured to:
control a plurality of radio resources for a plurality of mobile stations, wherein said controlling includes enabling dynamic switching of dedicated channels among the plurality of transceivers;
track usage of all radio resources available to the transceiver, wherein usage information is stored in a database of the resource manager;
check a priority level and availability of a radio resource responsive to a request for a radio resource generated by the processing unit; and
update the database responsive to granting the request.

67. The communications station as recited in claim 65, wherein the airlink controller is configured to control radio links between the mobile station and one or more of the plurality of receivers and further configured to control radio links between one or more additional mobile stations and one or more of the plurality of transceivers.

68. The communications station as recited in claim 64, wherein the processing unit is configured to:
monitor one or more control channels, wherein the control channels include dedicated control channels and broadcast control channels;
control dynamic switching speed;
control aggregation, wherein during aggregation, two or more of the plurality of transceivers are communicating with the mobile station;
extract radio link quality measurements for the mobile station based on said measurement information;
compare measurement information for each of the plurality of transceivers corresponding to one of the host zone manager and assistant zone managers in order to determine said preferred ones of the plurality of transceivers to provide dedicated channels for communications with the mobile station;

and determine a decision to switch a dedicated channel from a first one of the plurality of transceivers to a second one of the plurality of transceivers based on two consecutive measurement reports indicating that the second one of the plurality of transceivers provides a higher quality radio link than the first one of the plurality of transceivers.

69. The communications station as recited in claim 60, wherein the first radio resource is one of the plurality of radio resources, and wherein each of the plurality of radio resources comprise one of the following combinations:

a frequency and time slot combination;

a frequency and spreading code combination.

70. The communications station as recited in claim 60, wherein the communications station is configured to act as a host zone manager for one or more additional mobile stations.

71. The communications station as recited in claim 60, wherein the zone manager is configured to act as an assistant zone manager for at least one of the one or more additional zone managers.

72. A zone manager comprising:

first means for receiving measurement information from one or more additional zone managers and from a corresponding transceiver when said zone manager is acting as a host zone manager for a mobile station, said mobile station being configured to transfer uplink signals to and receive downlink signals from a plurality of transceivers including the corresponding transceiver, and wherein at least one of the one or more additional zone managers acts as an assistant zone manager, and wherein each of the one or more additional zone managers is associated with a corresponding one of the plurality of transceivers;

second means for processing said measurement information to determine preferred ones of a plurality of transceivers to provide dedicated channels for communication with the mobile station, wherein communication over said dedicated channels includes the use of a first radio resource; and third means for dynamically switching said dedicated channels between said preferred ones of the plurality of transceivers during communication with the mobile station over said dedicated channels, wherein said dynamic switching is performed without changing the first radio resource.

73. A communications system comprising:

a plurality of transceiver stations positioned at macrodiverse locations, wherein each of the plurality of transceivers is configured to transmit downlink signals to and receive uplink signals from one or more mobile stations;

a plurality of zone managers, wherein each of the zone managers corresponds to one of the plurality of transceiver stations, wherein each of the plurality of zone managers includes:

an interface unit coupling the zone manager to its corresponding transceiver and one or more other ones of the plurality of zone managers;

a processing unit configured to process measurement information received via the interface unit in order to determine preferred ones of a plurality of transceivers to provide dedicated channels for communication with a particular one of the one or more mobile stations, wherein communication over said dedicated channels includes the use of a first radio resource; and a control unit configured to dynamically switch said dedicated channels between said preferred ones of the plurality of transceivers during communication with the mobile station over said dedicated channels, wherein said dynamic switching is performed without changing the first radio resource.

\* \* \* \* \*

UNITED STATES PATENT AND TRADEMARK OFFICE
CERTIFICATE OF CORRECTION

PATENT NO. : 7,613,463 B2 Page 1 of 1
APPLICATION NO. : 12/245515
DATED : November 3, 2009
INVENTOR(S) : Dharia et al.

It is certified that error appears in the above-identified patent and that said Letters Patent is hereby corrected as shown below:

Column 18

Line 50, please delete "The apparatus as recited in claim 19, wherein, wherein the processing unit is configured to generate a resource request" and substitute -- The apparatus as recited in claim 19, wherein the processing unit is configured to generate a resource request --.

Signed and Sealed this

Sixteenth Day of February, 2010

David J. Kappos
*Director of the United States Patent and Trademark Office*